United States Patent [19]
Hara

[11] Patent Number: 5,737,590
[45] Date of Patent: Apr. 7, 1998

[54] BRANCH PREDICTION SYSTEM USING LIMITED BRANCH TARGET BUFFER UPDATES

[75] Inventor: Tetsuya Hara, Tokyo, Japan

[73] Assignee: Mitsubishi Denki Kabushiki Kaisha, Tokyo, Japan

[21] Appl. No.: 578,992

[22] Filed: Dec. 27, 1995

[30] Foreign Application Priority Data

Feb. 27, 1995 [JP] Japan .................. 7-038473

[51] Int. Cl.$^6$ ............................ G06F 9/22
[52] U.S. Cl. .......... 395/585; 395/586; 395/587
[58] Field of Search .................... 395/585, 586, 395/587

[56] References Cited

U.S. PATENT DOCUMENTS

| | | | |
|---|---|---|---|
| 4,679,141 | 7/1987 | Pomerene et al. | 395/375 |
| 5,265,213 | 11/1993 | Weiser et al. | 395/375 |
| 5,414,822 | 5/1995 | Saito et al. | 395/375 |
| 5,423,011 | 6/1995 | Blaner et al. | 395/375 |
| 5,442,756 | 8/1995 | Grochowski et al. | 395/375 |
| 5,522,053 | 5/1996 | Yoshida et al. | 395/421.03 |
| 5,577,217 | 11/1996 | Hoyt et al. | 395/376 |
| 5,581,717 | 12/1996 | Boggs et al. | 395/384 |
| 5,592,637 | 1/1997 | Matsuo | 395/584 |
| 5,608,886 | 3/1997 | Blomgren et al. | 395/586 |

OTHER PUBLICATIONS

"Super Scholar Processor", Mice Johnson, pp. 70–75, Sep. 1994.

21st Intl. Symp. on Computer Architecture, pp. 2–11, 1994, Brad Calder, et al., "Fast & Accurate Instruction Fetch and Branch Prediction".

Branch prediction strategies and branch target buffer design by Smith et al, Jan. 1984 publication, pp. 6–22, Jan. 1978.

*Primary Examiner*—Parshotam S. Lall
*Assistant Examiner*—Zarni Maung
*Attorney, Agent, or Firm*—Oblon, Spivak, McClelland, Maier & Neustadt, P.C.

[57] ABSTRACT

In a BTB, a lower part (ten-odd bits) of a branch target address obtained when a branch target generator executes a branch instruction is entered or updated as a prediction index. A linker links a prediction index signal (S1) read from the BTB with a PC output signal ($S_A$) indicating an upper part (several bits) of a branch instruction address to generate and output a predicted target address signal (S2) in a fetch stage. A comparator compares the branch target address signal ($S_C$) with the predicted target address signal (S2) to output a signal (S4) indicating whether they agree or not. A branch-prediction hit checking unit checks whether the branch prediction hits or misses by a result of a comparison between an execution result signal (S5) and a predicted direction signal (S3) and a result given by the signal (S4). Thus, a branch prediction system using the BTB enables reduction in volume of a BTB entry by half.

9 Claims, 28 Drawing Sheets

FIG. 10

| STATE | PREDICTION | EXECUTION RESULT | LOWER PART | BRANCH PREDICTION | UPPER PART | TAG CHECK | IC HIT/MISS | OPERATION |
|---|---|---|---|---|---|---|---|---|
| REFETCH | — | — | — | — | — | DISAGREEMENT | MISS | IC MISS OPERATION |
| REFETCH | — | — | — | — | — | AGREEMENT | HIT | — |
| NORMAL | not-taken | Not-taken | — | HIT | — | DISAGREEMENT | MISS | IC MISS OPERATION |
| NORMAL | not-taken | Not-taken | — | HIT | — | AGREEMENT | HIT | — |
| NORMAL | not-taken | Taken | — | MISS | — | — | — | REFETCH OPERATION |
| NORMAL | taken | Not-taken | — | MISS | — | — | — | REFETCH OPERATION |
| NORMAL | taken | Taken | DISAGREEMENT | MISS | — | — | — | REFETCH OPERATION |
| NORMAL | taken | Taken | AGREEMENT | HIT | DISAGREEMENT | — | MISS | IC MISS OPERATION |
| NORMAL | taken | Taken | AGREEMENT | HIT | AGREEMENT | — | HIT | — |

FIG. 13

| STATE | PREDICTION | EXECUTION RESULT | CHECK ADDRESS | LOWER PART | BRANCH PREDICTION | UPPER PART | IC HIT/MISS | OPERATION |
|---|---|---|---|---|---|---|---|---|
| REFETCH | - | - | PC | AGREEMENT | - | DIS-AGREEMENT | MISS | IC MISS OPERATION |
| REFETCH | - | - | PC | AGREEMENT | - | AGREEMENT | HIT | - |
| PREDICTED INSTRUCTION IS NOT BRANCH INSTRUCTION | not-taken | Not-taken | PC | AGREEMENT | HIT | DIS-AGREEMENT | MISS | IC MISS OPERATION |
| PREDICTED INSTRUCTION IS NOT BRANCH INSTRUCTION | not-taken | Not-taken | PC | AGREEMENT | HIT | AGREEMENT | HIT | - |
| PREDICTED INSTRUCTION IS NOT BRANCH INSTRUCTION | taken | Not-taken | PC | - | MISS | - | - | REFETCH OPERATION |
| PREDICTED INSTRUCTION IS BRANCH INSTRUCTION | not-taken | Not-taken | PC | - | HIT | DIS-AGREEMENT | MISS | IC MISS OPERATION |
| PREDICTED INSTRUCTION IS BRANCH INSTRUCTION | not-taken | Not-taken | PC | - | HIT | AGREEMENT | HIT | - |
| PREDICTED INSTRUCTION IS BRANCH INSTRUCTION | not-taken | Taken | - | - | MISS | - | - | REFETCH OPERATION |
| PREDICTED INSTRUCTION IS BRANCH INSTRUCTION | taken | Not-taken | - | - | MISS | - | - | REFETCH OPERATION |
| PREDICTED INSTRUCTION IS BRANCH INSTRUCTION | taken | Taken | target | DIS-AGREEMENT | MISS | - | - | REFETCH OPERATION |
| PREDICTED INSTRUCTION IS BRANCH INSTRUCTION | taken | Taken | target | AGREEMENT | HIT | DIS-AGREEMENT | MISS | IC MISS OPERATION |
| PREDICTED INSTRUCTION IS BRANCH INSTRUCTION | taken | Taken | target | AGREEMENT | HIT | AGREEMENT | HIT | - |

FIG. 23

| STATE | PRE-DICTION | EXECUTION RESULT | CHECK ADDRESS | LOWER PART | BRANCH PREDICTION HIT JUDGMENT | OPERATION IN CYCLE (i+3) | UPPER PART | IC HIT/MISS | OPERATION IN CYCLE (i+3) |
|---|---|---|---|---|---|---|---|---|---|
| REFETCH | - | - | - | - | - | - | DIS-AGREEMENT | MISS | IC MISS OPERATION |
|  | - | - | - | - | - | - | AGREEMENT | HIT | - |
| PREDICTED INSTRUCTION IS NOT BRANCH INSTRUCTION | not-taken | Not-taken | P C | AGREEMENT | HIT | - | DIS-AGREEMENT | MISS | IC MISS OPERATION |
|  | not-taken | Not-taken | P C | AGREEMENT | HIT | - | AGREEMENT | HIT | - |
|  | taken | Not-taken | P C | - | MISS | REFETCH OPERATION | - | - | - |
| PREDICTED INSTRUCTION IS BRANCH INSTRUCTION | not-taken | Not-taken | P C | - | HIT | - | DIS-AGREEMENT | MISS | IC MISS OPERATION |
|  | not-taken | Taken | P C | - | MISS | REFETCH OPERATION | - | - | - |
|  | taken | Not-taken | P C | - | MISS | REFETCH OPERATION | - | - | - |
|  | taken | Taken | target | DIS-AGREEMENT | MISS | REFETCH OPERATION | - | - | - |
|  | taken | Taken | target | AGREEMENT | HIT | - | DIS-AGREEMENT | MISS | IC MISS OPERATION |
|  | taken | Taken | target | AGREEMENT | HIT | - | AGREEMENT | HIT | - |

BRANCH PREDICTION SYSTEM USING LIMITED BRANCH TARGET BUFFER UPDATES

BACKGROUND OF THE INVENTION

1. Field of the Invention

The present invention relates to a system which dynamically performs a branch prediction by using a branch target buffer in an information processing device such as a pipelined processor.

2. Description of the Background Art

In a pipelined processor, a disorder caused by a branch is a great obstacle to its performance improvement. To decrease branch penalties, a branch prediction technique is generally introduced to the pipelined processor. There are two systems to perform the branch prediction: static and dynamic ones.

The static branch prediction system disadvantageously puts too much burden on a compiler and needs a change of an object code to transfer a static prediction result to the processor by means of an instruction. In contrast, the branch prediction system using a branch target buffer advantageously retains object code compatibility since the prediction is dynamically performed during execution of instructions. This dynamic prediction system, however, needs the branch target buffer (hereinafter referred to as "BTB") as a hardware to store information required for the branch prediction.

FIG. 27 shows a prior-art branch prediction system using the BTB. In FIG. 27, a tag storing part 1 of an instruction cache memory stores tags and outputs a signal $S_B$ indicating a tag i.e., a tag signal and an instruction storing part 2 of the instruction cache memory stores instructions, herein called an instruction cache. An access to the instruction cache memory is made using an address signal $S_A$ outputted from a PC 11. This means that the address signal $S_A$ gives an index of the instruction cache memory. If the instruction read from the instruction cache 2 is a branch instruction, a branch target generator 5, receiving a signal indicating the branch instruction, generates a signal $S_C$ indicating a branch target address i.e., a branch target address signal which is obtained by actual execution of that branch instruction, to output it. A branch instruction signal S14 decoded by a decoder 4 is outputted to an ALU (Arithmetic Logic Unit) and the like, and to a branch executing unit 9. Receiving the branch instruction signal S14, the branch executing unit 9 executes the branch instruction and generates a signal S5 indicating an execution result (branch direction) as to whether the branch is "Taken" or "Not-taken", i.e., an execution result signal, to output it.

On the other hand, a BTB controller 13 controls data of a BTB 3P to be entered, updated and read out. The BTB controller 13 receives the branch target address signal $S_C$, the execution result signal S5, a prediction hit checking result signal S6 outputted from a branch-prediction hit checking unit 10, the PC output signal $S_A$ and a signal S3 indicating the predicted branch direction (whether a "taken" prediction or a "not-taken" prediction) i.e., a predicted direction signal outputted from a branch direction predicting unit 6 and a signal S11 indicating a BTB entry information which consists of a BTB tag and a history information, i.e., a BTB entry information signal. In response to these signals, the BTB controller 13 outputs a BTB write signal S9 giving a write command to the BTB 3P, a BTB index signal S7 specifying an address generated in accordance with the inputted PC output signal $S_A$, and a BTB resister/update data signal S8 indicating data to be entered into the BTB 3 or updated, thus controlling the data resister and data update. When data are read from the BTB 3P, the BTB controller 13 outputs the BTB index signal S7 in accordance with the inputted PC output signal $S_A$ to the BTB 3P, and consequently the BTB 3P outputs a signal S2P indicating the predicted target address, i.e., a predicted target address signal to a comparator 8 and the PC 11 and outputs a signal indicating a history information and the like to the branch direction predicting unit 6.

The comparator 8 compares the signal $S_C$ with the signal S2P to check if all the bits of these signals agree and outputs a signal S4 indicating the comparison result of agreement or disagreement. The branch-prediction hit checking unit 10, receiving the signal S4 indicating the comparison result (agreement or disagreement) outputted from the comparator 8, checks whether the prediction of the branch target address hits or misses and compares the signal S3 with the signal S5 to check if these signals agree, thereby checking whether the prediction of the branch direction hits or misses. In accordance with these checking results, the branch-prediction hit checking unit 10 outputs the prediction hit checking result signal S6.

A tag check comparator 14 compares an upper part of the tag signal $S_B$ with that of the PC output signal $S_A$, and when the upper parts of these signals disagree, it outputs a signal S10 giving a command to perform an instruction-cache miss operation.

In a case where the instruction cache and the tag storing part share an entry of the BTB 3P, each entry of the prior-art BTB 3P consists of an effective bit for entry (1 bit), the tag (several bits), the history information (1 to 2 bits) and a branch target information (corresponding to the branch target address: 30 bits). The history information refers to a result (execution result) of a branch instruction executed until then. The branch prediction is performed using the BTB 3P, in accordance with the following procedures. FIG. 28 illustrates a parallel processing for the branch prediction (see "Computer Architecture", by Hennessy and Patterson, Morgan Kaufmann Publishers, INC.).

(1) Resister and Update: when a branch instruction is executed, the BTB controller 13 performs a registration or an update of an execution result including a branch target address and a branch direction in a BTB entry designated by the instruction address of that branch instruction.

(2) Prediction: in an instruction fetch stage, concurrently with the access to the instruction cache 2, an access to the BTB 3P is made using the same address (see the cycle i of FIG. 28). If the branch instruction has been entered in the BTB 3P, the branch direction predicting unit 6 predicts the branch direction in accordance with the history information of that instruction, and further if the predicted direction (S3) indicates a "taken" prediction, the PC 11 receives the branch target address ($S_C$) generated by the branch target generator 5 and sets it (see the cycle (i+1) of FIG. 28).

(3) Check of Prediction: when the branch instruction is executed, the branch-prediction hit checking unit 10 checks the execution result (S5) of that branch instruction outputted from the branch executing unit 9 with the predicted direction (S3) of that branch to check whether the predicted direction hits or misses (see the cycle (i+2) of FIG. 28). If there is a misprediction, in response to the prediction hit checking result signal S6 outputted from the branch-prediction hit checking unit 10, an incorrectly loaded instruction is made invalid and a correct instruction stream is fetched.

In the branch prediction system using the BTB, since the prediction is made for the branch instructions of which information has been entered in the BTB, a requirement, for a high hit rate, is that the BTB entry is hit and therefore a considerable number of entries are needed in the BTB. In order to achieve the prediction hit rate of about 80%, BTB entries of about 256 to 1K bits are generally required (see "Superscalar Processor", by M. Johnson).

Each entry, however, requires thirty-odd bits, being large, and accordingly, if a BTB has 512 entries, it requires a capacity of about 2.2 KB (35 bits each). Considering that the instruction cache memory has a capacity of 4 KB or 8 KB in a commonly-used microprocessor, the capacity required for the BTB is found considerably large.

Thus, the prior-art branch prediction system using the BTB has a disadvantage that the volume of hardware becomes much large as the number of entries increases, for a high hit rate.

SUMMARY OF THE INVENTION

The present invention is directed to a branch prediction system which performs a branch prediction when a branch instruction is fetched in a device executing each of instructions in a pipelined processing flow. According to a first aspect of the present invention comprises an instruction cache memory for storing the instructions; a branch target buffer for storing a signal indicating a lower part of a branch target address obtained in advance by execution of the branch instruction as a prediction index signal; branch instruction address generating means for generating and outputting a signal indicating a branch instruction address of the branch instruction actually fetched; and linking means for linking the prediction index signal fetched from the branch target buffer with an upper part of the branch instruction address indicated by an output signal of the branch instruction address generating means to generate and output a signal indicating a predicted target address.

According to a second aspect of the present invention, the branch prediction system of the first aspect further comprises branch target generating means for generating and outputting a signal indicating the branch target address obtained by actual execution of the branch instruction; and comparing means for comparing an output signal of the branch target generating means with an output signal of the linking means to output a signal indicating whether they agree or not.

According to a third aspect of the present invention, the branch prediction system of the second aspect further comprises branch target buffer controlling means for comparing an upper part of the branch target address indicated by the output signal of the branch target generating means with the upper part of the branch instruction address indicated by the output signal of the branch instruction address generating means and for storing a lower part of the branch target address into the branch target buffer only when they agree.

According to fourth and fifth aspects of the present invention, in the branch prediction system of the third and second aspects respectively, the branch target buffer stores a signal indicating a history information obtained in advance by execution of the branch instruction, and the branch prediction system further comprises branch executing means for generating and outputting a signal indicating a branch direction obtained by actual execution of the branch instruction; branch direction predicting means for generating and outputting a signal indicating a predicted branch direction in accordance with the signal indicating the history information fetched from the branch target buffer; prediction hit checking means for performing a comparison between an output signal of the branch executing means and an output signal of the branch direction predicting means to check if they agree and for checking whether the branch prediction hits or misses by a result of the comparison and a result indicated by an output signal of the comparing means to generate and output a signal indicating a prediction hit checking result; and instruction-cache miss judging means for generating and outputting a signal giving a command to start an instruction-cache miss operation only when an output signal of the prediction hit checking means indicates the branch prediction hits.

According to a sixth aspect of the present invention, the branch prediction system of the first aspect further comprises branch target generating means for generating and outputting a signal indicating the branch target address obtained by actual execution of the branch instruction; prediction index comparing means for comparing the lower part of the branch target address indicated by an output signal of the branch target generating means with the prediction index signal fetched from the branch target buffer to output a signal indicating whether they agree or not; upper part comparing means for comparing a signal indicating a tag fetched from the instruction cache memory in response to the output signal of the branch instruction address generating means with an upper part of the branch target address indicated by the output signal of the branch target generating means to output a signal indicating whether they agree or not; and branch prediction hit checking means for checking whether the predicted target address hits or misses on the basis of an output signal of the prediction index comparing means and an output signal of the upper part comparing means.

According to a seventh aspect of the present invention, the branch prediction system of the sixth aspect further comprises check address selecting means having inputs connected to the branch target generating means and the branch instruction address generating means respectively and outputs connected to the prediction index comparing means and the upper part comparing means respectively, for selectively outputting the output signal of the branch instruction address generating means or the output signal of the branch target generating means. In a case where the check address selecting means selects the output signal of the branch instruction address generating means, it outputs the same only to the upper part comparing means.

According to an eighth aspect of the present invention, in the branch prediction system of the sixth aspect, the instruction cache memory stores a signal indicating a physical tag, and a buffer for address translation is provided between an output of the branch target generating means and an input of the upper part comparing means, for performing a translation from the output signal of the branch target generating means to a signal of a physical page number.

According to a ninth aspect of the present invention, in the branch prediction system of the seventh aspect, the instruction cache memory stores a signal indicating a physical tag, and a buffer for address translation is provided between one of the outputs of the check address selecting means and an input of the upper part comparing means, for performing a translation from an output signal of the check address selecting means to a signal of a physical page number.

According to a tenth aspect of the present invention, the branch prediction system of the first aspect further comprises branch target generating means for generating and outputting a signal indicating the branch target address obtained by actual execution of the branch instruction;

prediction index comparing means for comparing the lower part of the branch target address indicated by an output signal of the branch target generating means with the prediction index signal fetched from the branch target buffer to output a signal indicating whether they agree or not; upper part comparing means for comparing a signal indicating a tag fetched from the instruction cache memory in response to the output signal of the branch instruction address generating means with an upper part of the branch target address indicated by the output signal of the branch target generating means to output a signal indicating whether they agree or not; and check address selecting means having inputs connected to the branch target generating means and the branch instruction address generating means respectively and outputs connected to the prediction index comparing means and the upper part comparing means respectively, for selectively outputting the output signal of the branch instruction address generating means or the output signal of the branch target generating means. In a case where the check address selecting means selects the output signal of the branch instruction address generating means, it outputs the same only to the upper part comparing means. In the branch prediction system of the tenth aspect, the instruction cache memory stores a signal indicating a physical tag, and a buffer for address translation is provided between one of the outputs of the check address selecting means and an input of the upper part comparing means, for performing a translation from an output signal of the check address selecting means to a signal of a physical page number. The branch prediction system of the tenth aspect further comprises branch executing means for generating and outputting a signal indicating a branch direction obtained by actual execution of the branch instruction; branch direction predicting means for generating and outputting a signal indicating a predicted branch direction in accordance with the signal indicating the history information fetched from the branch target buffer; prediction hit checking means for performing a comparison between an output signal of the branch executing means and an output signal of the branch direction predicting means to check if they agree and for checking whether the branch prediction hits or misses in accordance with a result of the comparison and a result indicated by an output signal of the prediction index comparing means to generate and output a signal indicating a prediction hit checking result; and instruction-cache miss judging means connected to an output of the upper part comparing means and an output of the prediction hit checking means, for generating and outputting a signal giving a command to start an instruction-cache miss operation only when an output signal of the prediction hit checking means indicates that the branch prediction hits. In the branch prediction system of the tenth aspect, the prediction hit checking means gives a command to start a refetch operation by outputting the signal indicating the prediction hit checking result at the point in time when it is checked that the branch prediction misses.

According to an eleventh aspect of the present invention, in the branch prediction system of the seventh aspect, the instruction cache memory stores a signal indicating a physical tag, and a buffer for inverse translation is provided between an output of the instruction cache memory and an input of the upper part comparing means, for performing an inverse translation from the signal indicating the physical tag to a signal of a virtual page number.

In the branch prediction system of the first aspect, the linking means links the upper part of the branch instruction address with the prediction index to generate the predicted target address.

Therefore, reducing the amount of the branch target information to be stored in the branch target buffer, the system of the first aspect produces an effect of decreasing the area of the branch target buffer in a hardware configuration of this system.

In the branch prediction system of the second aspect, the comparing means judges whether the predicted target address generated by the linking means agrees with the branch target address obtained by the actual execution of the branch instruction or not.

Therefore, the system of the second aspect achieves the prediction of the branch target with the volume of the branch target buffer entry reduced.

In the branch prediction system of the third aspect, the branch target buffer controlling means stores the prediction index into the branch target buffer if the branch instruction address and the branch target address have the same upper part, and otherwise does not store it.

Since the branch target information which causes a misprediction is not stored into the branch target buffer, the system of the third aspect allows an efficient use of the branch target buffer entry and achieves a high hit rate of the branch prediction.

In the branch prediction system of the fourth and fifth aspects, the instruction-cache miss judging means does not give the command to start the instruction-cache miss operation until the prediction hit checking means outputs the signal indicating that the branch prediction hits.

Therefore, the system of the fourth and fifth aspects performs the instruction-cache miss operation only when the operation is essentially needed although it is unnecessarily performed in the prior art even when a misprediction occurs, to achieve a high hit rate of the branch prediction.

In the branch prediction system of the sixth aspect, the prediction index comparing means compares the lower part of the predicted target address with the index to be used for the access to the instruction cache memory to check if they agree, and the upper part comparing means compares the upper part of the branch target address with the tag to check if they agree.

Thus, the system of the sixth aspect ensures the branch prediction even if the predicted target address and the branch target address have different upper parts and a correct instruction is fetched, in fact, from the instruction cache memory, to achieve a high hit rate of the branch prediction.

In the branch prediction system of the seventh aspect, when the check address selecting means selectively outputs the signal indicating the branch target address, the prediction index comparing means compares the prediction index with the lower part of the branch target address and the upper part comparing means compares the tag with the upper part of the branch target address.

Thus, the system of the seventh aspect eliminates the need for the comparator for judging whether the instruction-cache miss operation needs to be performed or not.

In the branch prediction system of the eighth aspect, the buffer for address translation performs the address translation from the branch target address to an address of physical page number and thereafter outputs the translated branch target address which is a physical address to the upper part comparing means.

Therefore, the system of the eighth aspect ensures the branch prediction even if the predicted target address and the branch target address have different upper parts and a correct instruction is fetched, in fact, from the instruction cache memory, to achieve a high hit rate of the branch prediction.

In the branch prediction system of the ninth aspect, the buffer for address translation performs the address translation from the signal selectively outputted from the check address selecting means to an address of physical page number and thereafter outputs the translated output signal of the check address selecting means which is a physical address to the upper part comparing means.

Therefore, the system of the ninth aspect makes the branch prediction check and the judgment as to whether the instruction-cache miss operation needs to be performed or not by using the upper part comparing means in common, without the comparator for the instruction-cache miss judgment nor a plurality of buffers for address translation.

In the branch prediction system of the tenth aspect, the instruction-cache miss judging means gives the command to start the instruction-cache miss operation only when the output signal of the branch prediction hit checking means indicates that the prediction hits.

Therefore, the system of the tenth aspect allows reduction in the penalty cycle caused by the misprediction which is checked by the disagreement of the branch directions or the disagreement of the prediction indexes.

In the branch prediction system of the eleventh aspect, the buffer for inverse translation performs the inverse translation from the signal indicating the physical tag outputted from the instruction cache memory to the signal of virtual page number.

Therefore, the system of the eleventh aspect produces an effect of reducing the penalty cycle by one cycle when the instruction-cache miss operation is performed.

A first object of the present invention is to reduce the volume of the BTB entry without deteriorating the prediction hit rate.

A second object of the present invention is to achieve an effective use of the BTB by omitting the branch target information to be unpredicted when it is entered into the BTB.

A third object of the present invention is to avoid the instruction-cache miss operation caused by a misprediction.

A fourth object of the present invention is to ensure the prediction even if the predicted target address and the branch target address obtained by actual execution of the branch instruction have different upper parts, and thereby to improve the hit rate.

A fifth object of the present invention is to omit the tag check comparator, which has been needed for the instruction-cache miss judgment in the prior art.

A sixth object of the present invention is to ensure a prediction even if the predicted target addresses and the branch target address obtained by actual execution of the branch instruction have different upper parts in a case where the TLB is used.

A seventh object of the present invention is to omit the comparator for the instruction-cache miss judgment and a read port for the TLB in a case where the TLB is used.

An eighth object of the present invention is to reduce the penalty cycle of the misprediction in a case where the TLB is used.

Still, a ninth object of the present invention is to reduce the penalty cycle of the instruction-cache miss.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is an illustration of a process rule of the fourth preferred embodiment of the present invention;

FIG. 13 is an illustration of a process rule of the fifth preferred embodiment of the present invention;

FIG. 23 is an illustration of a process rule of the eighth preferred embodiment of the present invention;

DESCRIPTION OF THE PREFERRED EMBODIMENTS

<The First Preferred Embodiment>

A characteristic feature of the first preferred embodiment lies in that a BTB (Branch Target Buffer) stores only a lower part (referred to as "prediction index") of a branch target address as branch target information. By linking the prediction index read from the BTB when the instruction is fetched with an upper part of the PC (Program Counter) in that cycle, a predicted target address is generated.

Now, a detailed discussion on the first preferred embodiment will be presented below.

There are two ways to reduce the volume of hardware, one is to decrease the number of BTB entries and the other is to decrease the size of each BTB entry. For high prediction hit rate of the BTB, it should be avoided to decrease the number of BTB entries. Accordingly, the decrease in size of each BTB entry is the selected solution. The prior-art BTB entry is mostly occupied with the branch target information. A study on a possibility of decreasing the branch target information for size reduction of the BTB entry will be presented below.

Considering a locality of instruction reference, it seems that a jumping range (branch distance) of a branch instruction, which indicates how many instructions ahead of that branch instruction is its destination, is small in most cases. A study was performed on distributions of branch distances in eight integral-system programs including three SPECints which are used to examine computers' performances.

Figure 1:
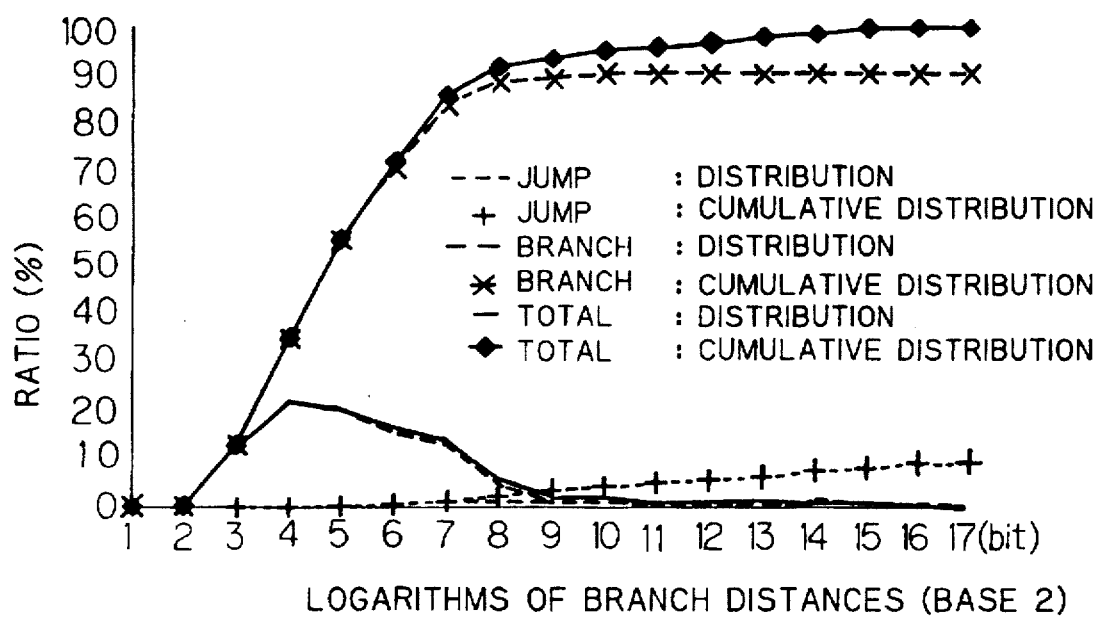
FIG. 1 is an illustration of distributions of branch distances.

FIG. 1 is a graph of arithmetic means, showing the ratios of distribution and cumulative distribution with respect to "Branch" which is a relative branch with respect to an address value of the PC, "Jump" which is a branch using an absolute address and "Total" which is a sum of "Branch" and "Jump". As can be seen from this figure, most branches have short branch distances and therefore it seems a rare case that the branch instruction address and the branch target address obtained by actual execution of that branch instruction have different upper parts. In other words, using a predicted target address generated by combining a lower part from the BTB and an upper part which is equivalent to the upper address of the branch instruction, rather than the predicted target address of which all the bits are generated using the BTB, causes little deterioration in accuracy of the prediction. From that reason, the first preferred embodiment stores only a lower part of the branch target address in the BTB as the prediction index, thereby reducing the number of bits needed for the branch target information of the BTB entry.

Figure 2:
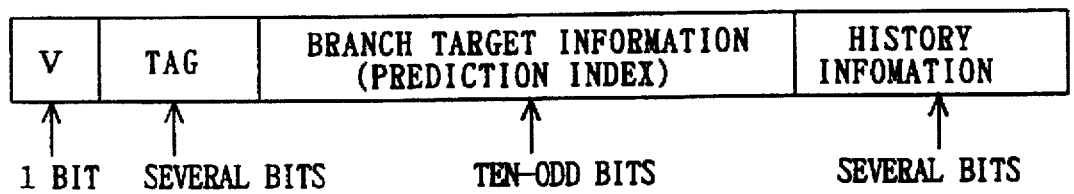
FIG. 2 is an illustration of a structure of a BTB entry.
Figure 3:
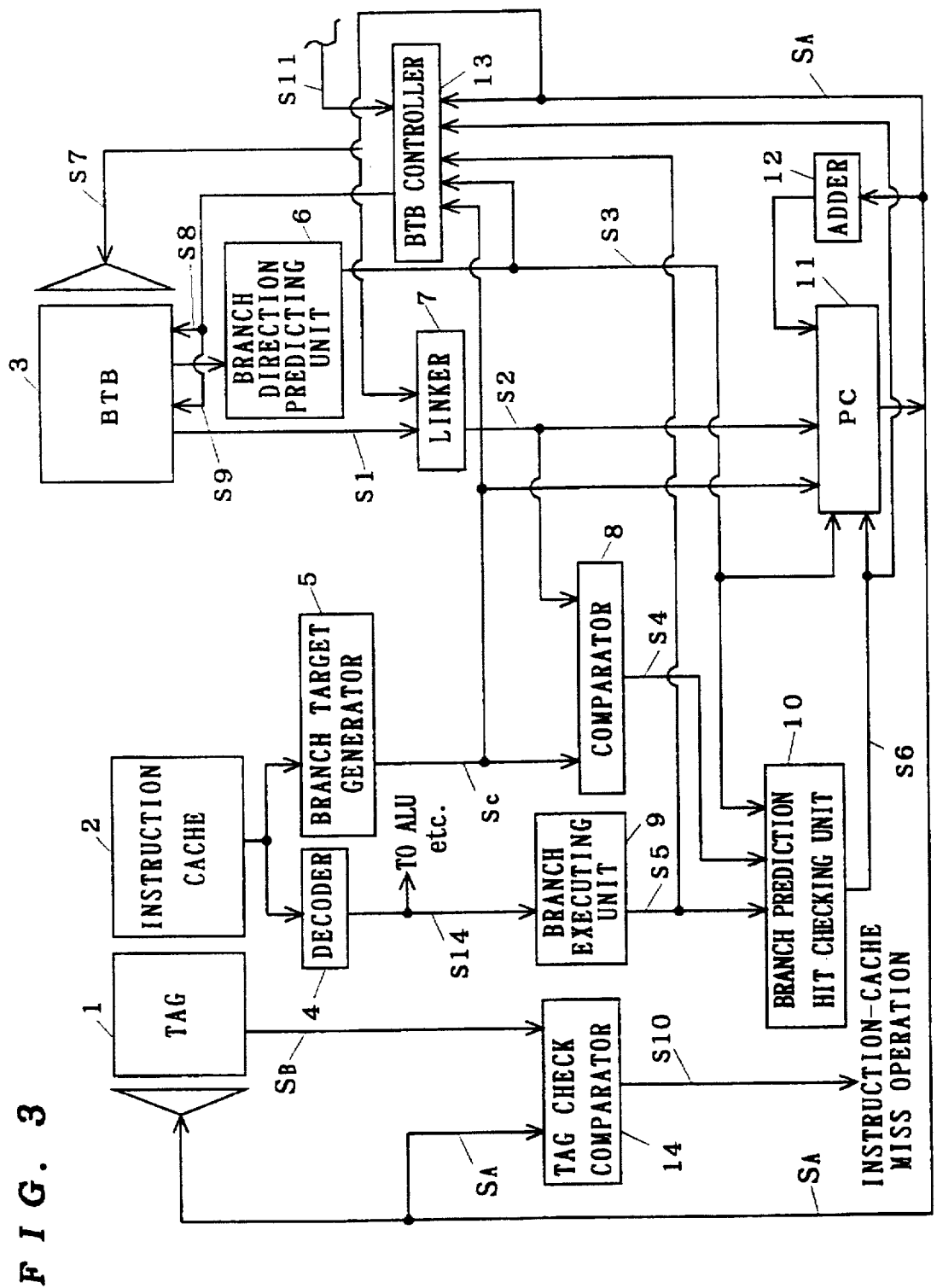
FIG. 3 is a block diagram showing a configuration of a branch prediction system in accordance with a first preferred embodiment of the present invention.

FIG. 2 shows a structure of the BTB entry used in the branch prediction system, while FIG. 3 is a block diagram showing a hardware configuration of the branch prediction system.

In FIG. 3, a tag storing part 1 of an instruction cache memory stores tags and outputs a signal $S_B$ indicating a tag, i.e., a tag signal and an instruction storing part 2 of the instruction cache memory stores instructions, which is herein called an instruction cache. An access to the instruction cache memory is made using an address signal $S_A$ outputted from a PC 11. This means that the address signal $S_A$ gives an index of the instruction cache memory. If the instruction read from the instruction cache 2 is a branch instruction, a branch target generator 5, receiving a signal indicating the branch instruction, generates a signal $S_C$ indicating a branch target address, i.e., a branch target address signal which is obtained by actual execution of that branch instruction, to output it. At this time, the PC 11 corresponds to a branch instruction address generator which generates a signal indicating the branch instruction address and outputs it. A branch instruction signal S14 decoded by a decoder 4 is outputted to an ALU (Arithmetic Logic Unit) and the like, and to a branch executing unit 9. Receiving the branch instruction signal S14, the branch executing unit 9 executes the branch instruction and generates a signal S5 indicating an execution result (branch direction) as to whether the branch is "Taken" or "Not-taken", i.e., an execution result signal, to output it.

On the other hand, a BTB controller 13 controls data of a BTB 3 to be entered, updated and read out ("data storage" is a general term for the data resister and data update). This BTB controller 13 receives the branch target address signal $S_C$, the execution result signal S5, a prediction hit checking result signal S6 outputted from a branch-prediction hit checking unit 10, the PC output signal $S_A$, a signal S3 indicating the predicted branch direction (whether a "taken" prediction or a "not-taken" prediction), i.e., a predicted direction signal outputted from a branch direction predicting unit 6 and a signal S11 indicating a BTB entry information which consists of a BTB tag and a history information, i.e., a BTB entry information signal. In response to these signals, the BTB controller 13 outputs a BTB write signal S9 giving a write command to the BTB 3, a BTB index signal S7 specifying an address generated in accordance with the inputted PC output signal $S_A$, and a BTB resister/update data signal S8 indicating data to be entered into the BTB 3 or updated, thus controlling the data resister and data update. When data are read from the BTB 3, the BTB controller 13 outputs the BTB index signal S7 in accordance with the inputted PC output signal $S_A$ to the BTB 3, and consequently the BTB 3 outputs a signal S1 indicating a prediction index, i.e., a prediction index signal to a linker 7 and outputs a signal indicating a history information and the like to the branch direction predicting unit 6. The linker 7 links the signal S1 with an upper part of the address specified by the PC output signal $S_A$ and outputs a signal obtained by the linkage as a signal S2 indicating the predicted target address, i.e., a predicted target address signal to a branch target address comparator 8 (herein simply referred to as "comparator 8") and the PC 11.

The comparator 8 compares the signal $S_C$ with the signal S2 to check if all the bits of these signals agree and outputs a signal S4 indicating the comparison result of agreement or disagreement. The branch-prediction hit checking unit 10, receiving the signal S4 indicating the comparison result (agreement or disagreement) outputted from the comparator 8, checks whether the prediction of the branch target address hits or misses and compares the signal S3 with the signal S5 to check if they agree, thereby checking whether the prediction of the branch direction hits or misses. In accordance with these checking results, the branch-prediction hit checking unit 10 outputs the prediction hit checking result signal S6.

A tag check comparator 14 compares the upper part of the tag signal $S_B$ with that of the PC output signal $S_A$, and when the upper parts of these signals disagree, it outputs a signal S10 giving a command to perform an instruction cache miss-hit operation.

In the system of the first preferred embodiment, the branch prediction is performed in accordance with the following procedures:

(1) Register and Update: when a branch instruction is fetched from the instruction cache 2 and executed, a branch target generator 5 generates the signal $S_C$ indicating the branch target address (called "refetch address" since it is set in the PC 11 as an address to be used for refetching). Receiving the branch target address signal $S_C$, the BTB controller 13 performs a registration or an update of only the lower part (called "prediction index") of the branch target address ($S_C$) as a branch target information, as well as the execution result (S5) indicating the branch direction, etc. and the BTB entry information (S11), in a BTB entry designated by the instruction address of that branch instruction.

(2) Prediction: in an instruction fetch stage, concurrently with the access to the instruction cache 2, an access to the BTB 3 is made using the same address. If the branch instruction has been entered in the BTB 3, the branch direction predicting unit 6 predicts the branch direction in accordance with the history information of that instruction to output the predicted direction signal S3, while the BTB controller 13 reads the prediction index from a branch target information field of the BTB entry and then the linker 7 links the prediction index with the upper part of the branch instruction address indicated by the output signal $S_A$ of the PC 11 in that cycle to generate a signal S2 indicating the predicted target address (PTA). If the predicted direction signal (S3) indicates branching, i.e., a "taken" prediction, the PC 11 receives the predicted target address (S2) to set it.

(3) Check of Prediction: when the branch instruction is executed by the branch executing unit 9, the branch-prediction hit checking unit 10 compares the execution result S5 (indicating whether a "Taken" branch or a "Not-taken" branch) with the predicted branch direction (predicted direction S3 indicating whether a "taken" prediction or a "not-taken" prediction) and compares the branch target addresses, thus checking the branch prediction. If the branch directions disagree, or the branch target addresses disagree even when the branch directions agree to indicate a "Taken" branch, the prediction is found false, and consequently an incorrectly loaded instruction is made invalid and a correct instruction stream is fetched.

Thus, a decrease in the number of bits of the prediction index as the branch target information to be stored in the BTB 3 allows size reduction of the BTB entry, but may cause a deterioration of the prediction hit rate because of a limitation of the branch distance, which is expressed through displacement. FIG. 1, however, shows that the displacement, i.e., the logarithm of 10 bits for the branch distance can cover 95% of branch instructions and further that of 17 bits can cover 100%.

As can be seen from this figure, the prediction index to be stored in the BTB 3 as branch target information requires only ten-odd bits, and therefore, the size of the BTB entry can be reduced by about half, from thirty-odd bits in the prior art to ten-odd bits, thus lessening the area of the BTB 3.

Thus, the first preferred embodiment has an advantage that the area of the BTB 3 can be lessened by size reduction of the BTB entry from thirty-odd bits in prior art to ten-odd bits, without deteriorating the prediction hit rate.

<The Second Preferred Embodiment>

The prediction index storage system in accordance with the first preferred embodiment surely has the advantage that the area of the BTB is lessened by linking the upper part of the branch instruction address used for the access to the BTB with the lower part (prediction index) of the branch target address, but on the other hand, has a disadvantage that it is impossible to perform a correct prediction when the branch instruction address and the branch target address have different upper parts.

Figure 4:
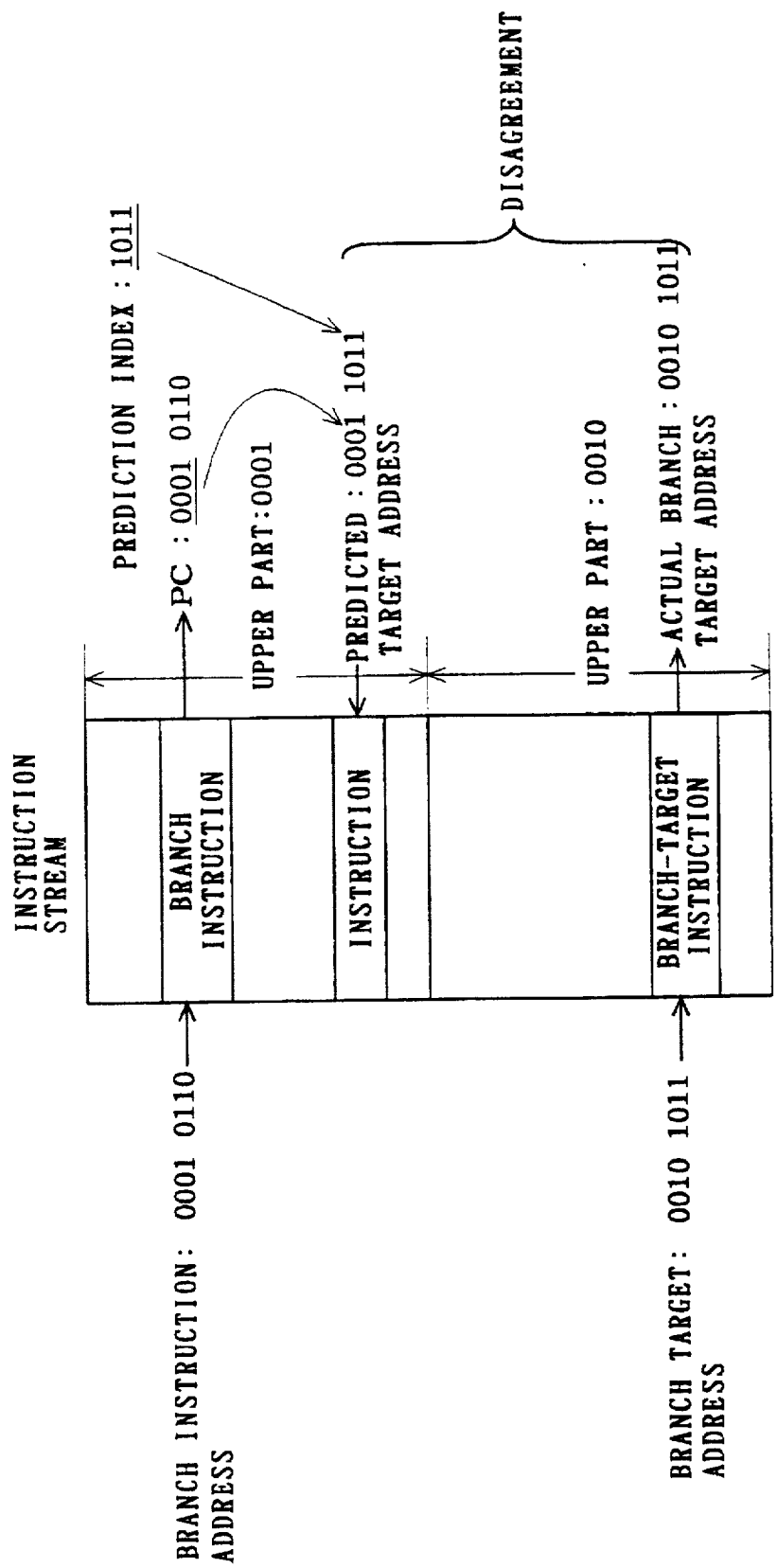
FIG. 4 is an illustration to point out a problem of the first preferred embodiment of the present invention.

For simplicity of discussion on the problem, an address of the branch instruction is assumed to have 8 bits. For example, a branch instruction of which the address is designated "00010110" is executed and a branch is taken to the branch target address designated "00101011", as shown in FIG. 4. Assuming that the prediction index of 4 bits is stored in the BTB, the lower part "1011" of the branch target address is entered into the BTB as the prediction index. When the counter value of the PC comes to "00010110", that branch instruction is fetched again and the prediction index "1011" read from the BTB is linked with the upper part "0001" of the PC to generate a predicted target address "00011011". The predicted target address designated "00011011", however, is wrong, being different from the correct branch target address designated "00101011" (see FIG. 4), and therefore the branch-target prediction definitely misses. In other words, even if the prediction index has been entered in the BTB, it is impossible to make a correct prediction, causing a miss penalty of the prediction every time.

Figure 5:
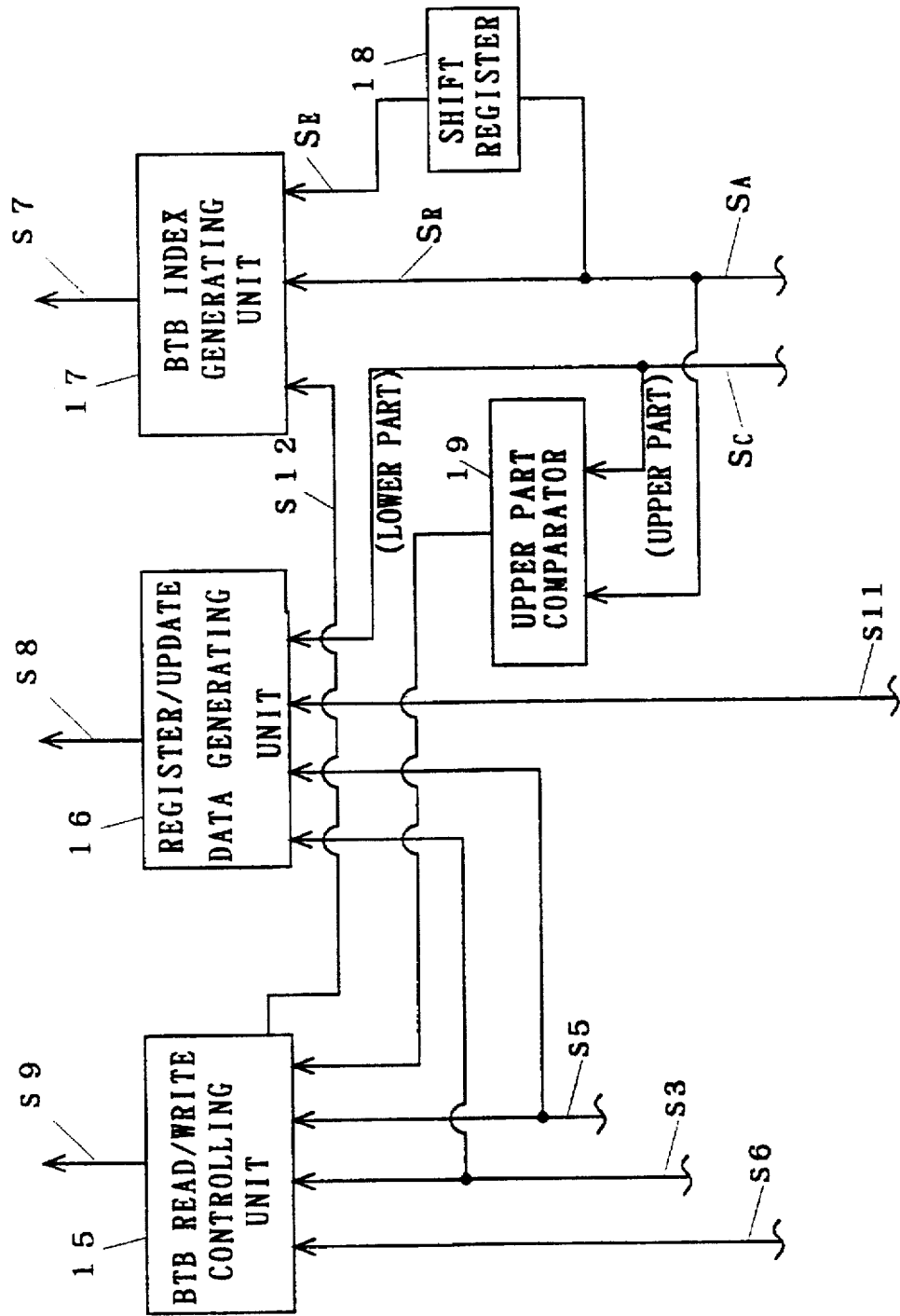
FIG. 5 is a block diagram showing a configuration of a BTB controller in accordance with a second preferred embodiment of the present invention.

To solve the above problem, in the second preferred embodiment, if the branch instruction address and the branch target address with respect to a branch instruction have different upper parts, the branch target information of that branch instruction is not entered into the BTB. As shown in FIG. 5, an upper part comparator 19 is additionally provided within the BTB controller 13A to compare the upper part of the branch instruction address with that of the branch target address to check if they agree during the execution. The configurational features other than the above are the same as the those of the first preferred embodiment.

A BTB controller 13A of FIG. 5 has a BTB read/write controlling unit 15, a registration/update data generating unit 16, a BTB index generating unit 17 and a shift register 18, which are in common with the BTB controller 13 of the first preferred embodiment. The BTB read/write controlling unit 15 starts its write control operation in response to a result outputted from the upper part comparator 19. When the BTB read/write controlling unit 15 outputs a signal S12 giving a write command, the BTB index generating unit 17 outputs an output signal $S_E$ of the shift register 18 as the BTB index signal S7. On the other hand, when the BTB read/write controlling unit 15 outputs the signal S12 giving a read command, the BTB index generating unit 17 outputs the PC output signal $S_A$ as the BTB index signal S7.

An operation of the BTB controller 13A in a registration stage will be discussed below.

(1) If the branch instruction address, i.e., the PC output signal $S_A$ and the branch target address signal $S_C$ have the same upper parts, a data registration is made to the BTB in accordance with a normal rule.

(2) On the other hand, if these two signals have different upper parts, the BTB controller 13A does not perform a data registration to the BTB even when the predicted direction signal S3 indicates a "taken" prediction because a correct prediction can not be made even if the registration has been done. Specifically, the BTB read/write controlling unit 15 does not output a BTB write signal S9 or a command signal S12.

That produces two effects. First, an efficient use of the BTB entry can be achieved since the data with respect to a branch instruction which causes a misprediction is not entered to the BTB. Second, in a conditional branch of "taken" prediction, although the system of the first preferred embodiment always fails a prediction, whether a "Taken" branch or a "Not-taken" branch, as the branch target information has been entered into the BTB, the system of the second preferred embodiment succeeds in the prediction when the branch is "Not-taken" because the branch target information has not been entered into the BTB when the upper part comparator 19 indicates disagreement, to improve the hit rate of the branch prediction.

Thus, an efficient use of the BTB entry is achieved and moreover a prediction is successful when a conditional branch is predicted as "taken" but is actually executed as "Not-taken".

<The Third Preferred Embodiment>

Since an access to the instruction cache is made using part of an address (in general, the lower address), instructions of the same address for cache access (the address is called "index") are stored in the same entry of the instruction cache memory. To check if the instruction read from the memory is correct, the instruction cache memory stores the address except the index part, which is called a "tag".

When the access to the instruction cache memory is made using an address given by the program counter (PC), i.e., the PC output signal $S_A$, normally the tag is read therefrom concurrently with the instruction and compared with a corresponding part of the PC output to check if they agree (tag check), thus checking whether or not a correct instruction has been read, i.e., the instruction cache is hit. If the tag disagrees with the corresponding part of the PC output, an instruction-cache miss occurs and an "instruction-cache miss operation" is consequently performed for fetching the required instruction from a memory device which is one-level lower in the cache (a main memory or a secondary cache memory: not shown). The execution of the instruction-cache miss operation generally requires ten-odd cycles to thirty-odd cycles, leading to a problem that no instruction can be fetched during the execution of the instruction-cache miss operation.

In a case of branch prediction, a further problem arises that a misprediction also causes the execution of the instruction-cache miss operation and therefore the unnecessary instruction-cache miss operation hinders a pipelined execution, to degrade its performance.

In the third preferred embodiment, the instruction-cache miss operation does not start until whether the branch prediction is correct or false is found, but the instruction-cache miss operation starts only when a judgment is made that the branch prediction is correct and the instruction cache is missed.

Figure 6:
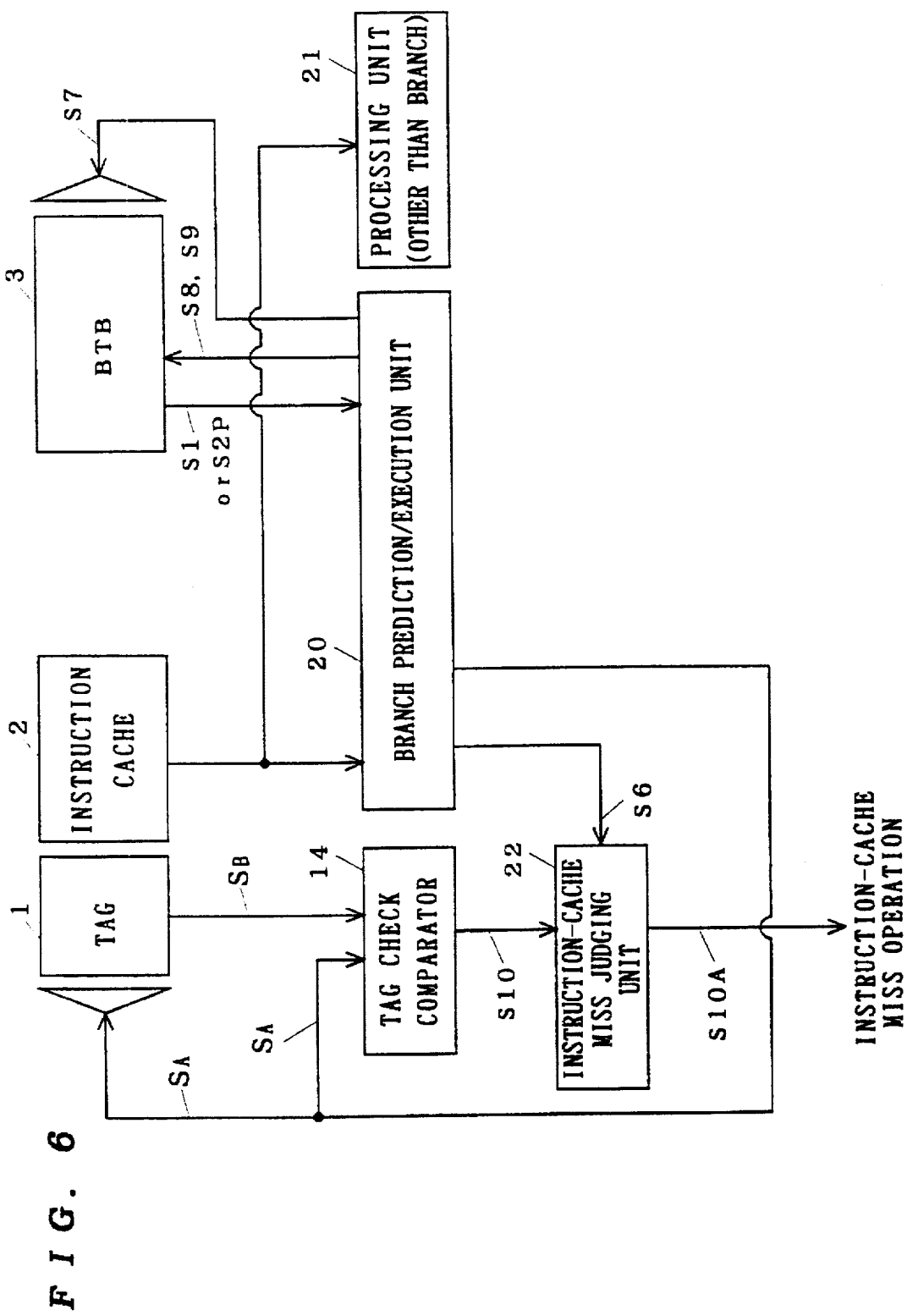
FIG. 6 is a block diagram showing a configuration of a branch prediction system in accordance with a third preferred embodiment of the present invention.
Figure 27:
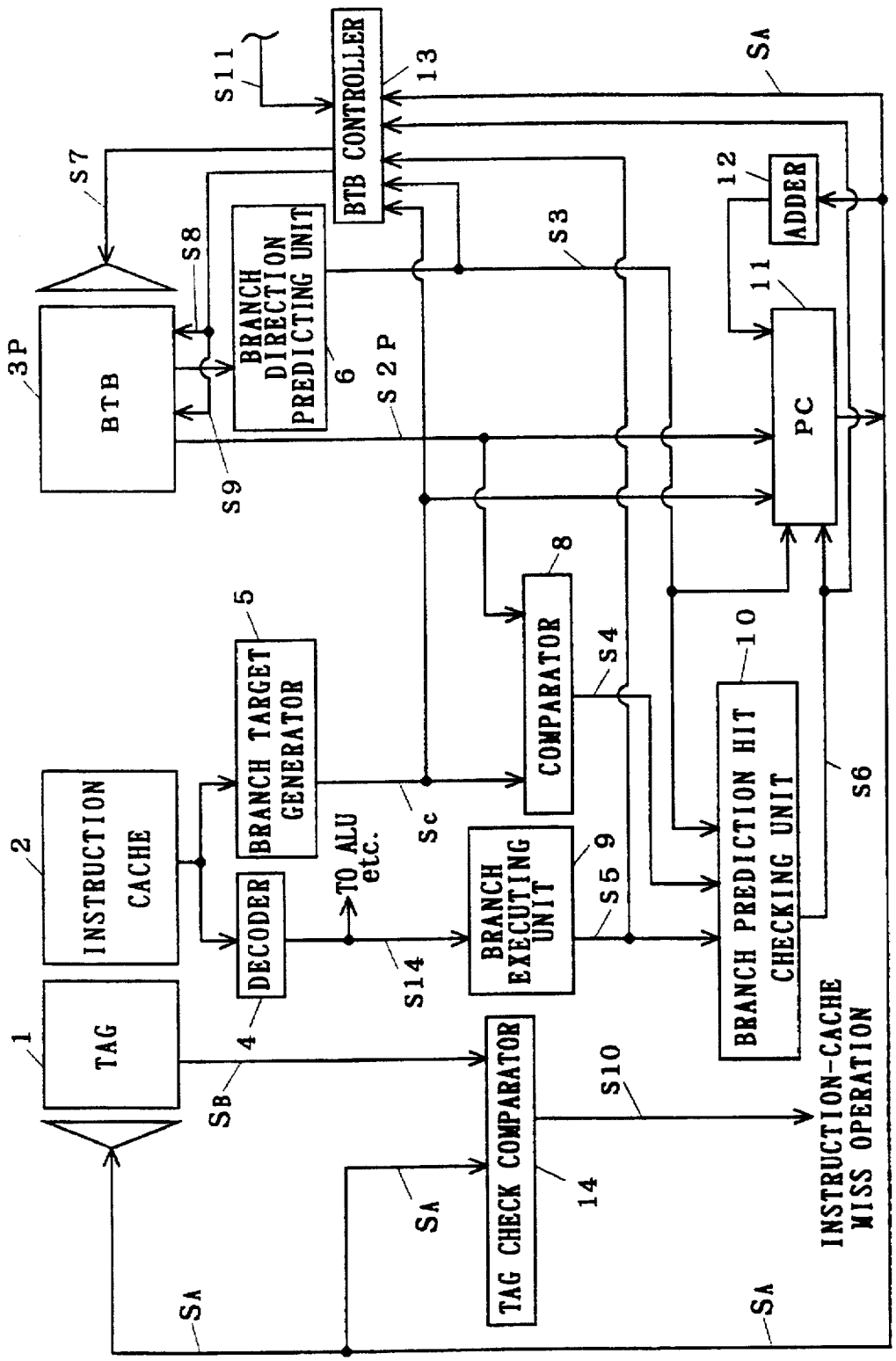
FIG. 27 is a block diagram of a configuration of a branch prediction system of a prior art.

As shown in FIG. 6, in the third preferred embodiment, an instruction-cache miss judging unit 22 (which includes an AND circuit, for example) which receives the signal S6 indicating a prediction hit checking result (hit/miss) and the signal S10 indicating the result of the tag check is additionally provided, to perform the following processing. The tag check comparator 14 of FIG. 6 is the same as that of FIGS. 3 and 27, and a branch prediction/execution unit 20 includes all the parts except the tag storing part 1, the instruction cache 2, the BTB 3 (3P) and the tag check comparator 14 of FIGS. 3 and 27. A unit 21 of FIG. 6 for executing instructions other than branch instructions is omitted in FIGS. 3 and 27, for the convenience of description.

Figure 28:
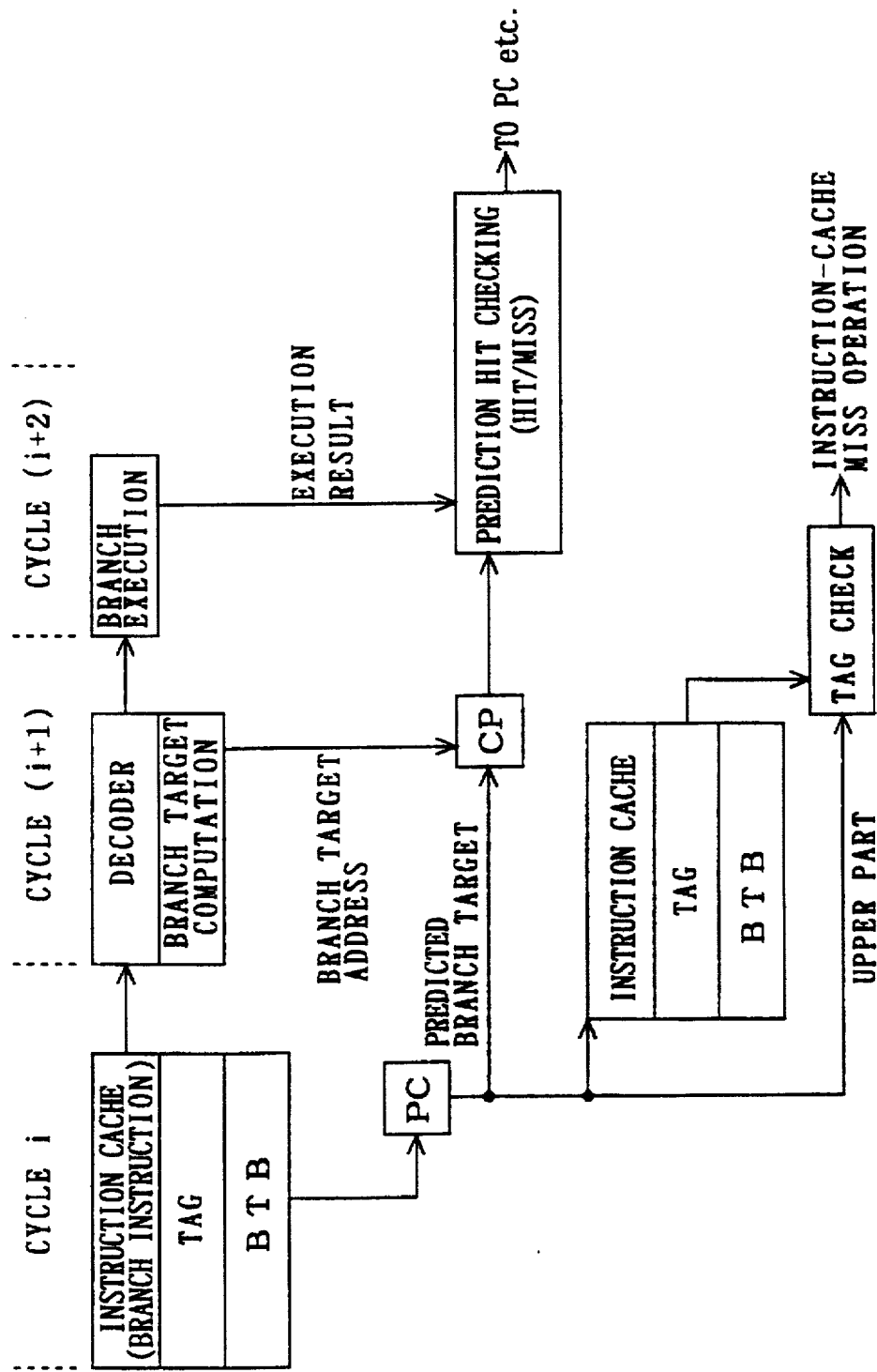
FIG. 28 is an illustration of a process flow of the prior-art branch prediction system.

(1) The tag check comparator 14 compares the predicted target address ($S_A$) with the tag ($S_B$) read out in accordance with the predicted target address to check if they agree (tag check) (see the cycle (i+1) of FIG. 28).

(2) In the next cycle, the branch prediction/execution unit 20 checks whether the branch prediction hits or misses.

(3) In response to the signal S10 indicating the result of (1) and the signal S6 indicating the result of (2), the instruction-cache miss judging unit 22 decides whether to perform the instruction-cache miss operation or not.

(3-1) If the signal S10 indicates that the tag disagrees with the predicted target address; as the instruction cache is hit, the instruction-cache miss judging unit 22 does not output a signal S10A giving a command to perform the instruction-cache miss operation, regardless of the signal S6.

(3-2) If the signal S10 indicates that the tag disagrees with the predicted target address;

(3-2-1) If the signal S6 indicates a misprediction; the instruction-cache miss judging unit 22 also does not output the signal S10A and accordingly the instruction-cache miss operation is not performed.

(3-2-2) If the signal S6 indicates that the branch prediction hits; the instruction-cache miss judging unit 22 outputs the signal S10A and consequently the instruction-cache miss operation is performed.

Thus, the third preferred embodiment avoids a deterioration of performance due to the unnecessary instruction-cache miss operation caused by the misprediction since the instruction-cache miss operation is performed only when it is essentially needed.

<The Fourth Preferred Embodiment>

In the branch prediction system of the first preferred embodiment, the comparator 8 of FIG. 3 compares the branch target address ($S_C$) with the predicted target address (S2) using all the bits in checking whether the prediction hits or not, if the branch instruction address and the branch target address obtained by execution of the branch instruction have different upper parts, the branch-prediction hit checking unit 10 of FIG. 3 checks that the branch prediction misses by the disagreement of the predicted target address (S2) and the branch target address ($S_C$) (the output signal of the comparator 8 in FIG. 3 indicates "disagreement").

It is sure that if the number of bits of the prediction index (S1 of FIG. 3) is equal to the number of bits of the index for the access to the instruction cache or more, the access to the instruction cache, which is made using the prediction index, has no relation to the upper part of the predicted target address, and accordingly only if the prediction index is correctly predicted, even when the predicted upper part is incorrect, an instruction can be read from the right entry of the instruction cache. Then, it is true that if the branch-target instruction is not replaced with another instruction through line substitution of the instruction cache memory, it is judged the instruction read therefrom is correct. Considering the locality of instruction reference, a possibility of reading a correct instruction is expected to be considerably high. That will be discussed below, showing a specific example.

Figure 7:
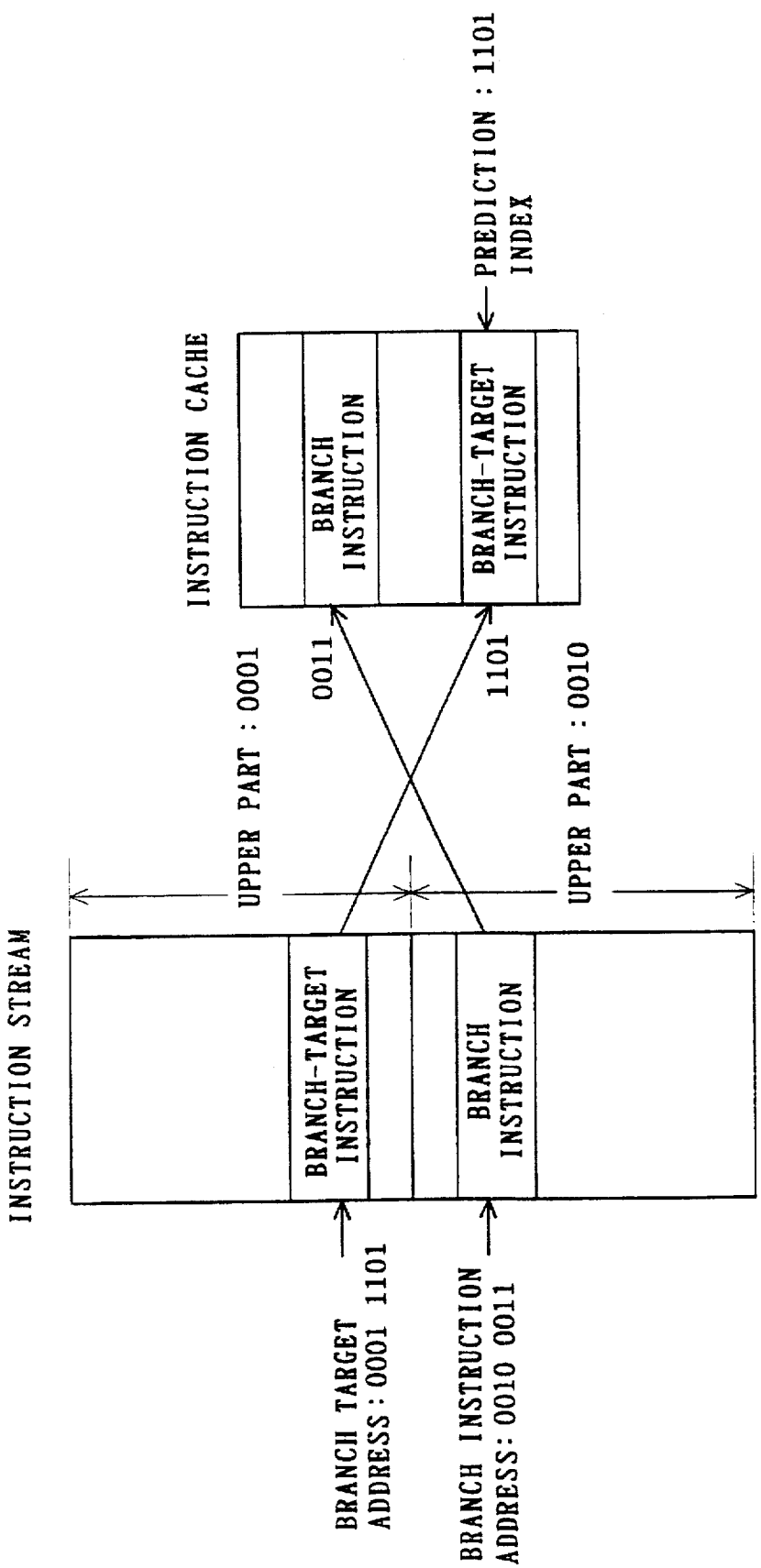
FIG. 7 is an illustration of a relation between an instruction stream and an inside arrangement of an instruction cache.

As shown in FIG. 7, for example, when the instruction address of a branch instruction for a loop is designated "00100011" and the branch target address is designated "00011101", assuming that the prediction index has 4 bits, the branch instruction address and the branch target address have different upper parts. If an access to the instruction cache is made using an index of 4 bits, these instructions are individually stored as illustrated in FIG. 7. When the PC indicates "00100011", that branch instruction is fetched and the prediction index "1101" read from the BTB is linked with the output of the PC to generate a predicted target address "00101101". An access to the instruction cache in the next cycle is made using the predicted target address ("00101101"). In this access, as the index of 4 bits is used, the instruction cache is accessed using the index "1101" and a correct instruction can be read.

In the first preferred embodiment, however, a comparison between the predicted target address "00101101" and the branch target address "00011101" obtained by actual execution of the branch instruction is made using all the bits thereof, in a case of FIG. 7, resulting in disagreement, and accordingly it is checked that the branch prediction misses. Thus, although a correct instruction is actually fetched from the instruction cache, the instruction is made invalid.

In the fourth preferred embodiment, for check as to whether the branch instruction hits or misses, two comparisons are made, between the prediction index (S1) fetched from the BTB and the lower part of the branch target address ($S_C$) and between the tag ($S_B$) read from the tag storing part (1) of the instruction cache memory and the branch target address (refetch address) obtained by the execution of the branch instruction (this comparison corresponds to a comparison of the upper parts) to check if they agree. That will be discussed below in detail.

In the branch prediction system using the BTB of the first preferred embodiment, as described earlier, an access to the instruction cache memory is first made using the predicted target address, and the tag check comparator compares the tag read from the tag storing part with the upper part of the output of the PC (tag check), to check if the instruction associated with the predicted branch target is fetched. Subsequently, the comparator compares the predicted target address with the branch target address obtained by the execution of the branch instruction, and the branch-prediction hit checking unit compares the predicted branch direction with the actual branch direction in the execution, thus checking whether the prediction is successful or not.

Assuming now that the upper part of the predicted target address, the tag read from the instruction cache memory and the upper part of the branch target address are represented by A, B and C, respectively, if an instruction corresponding to the branch target address C is fetched, i.e., B=C, the branch prediction is checked to be correct.

In the first preferred embodiment, checking if A=B and if A=C, only when A=B and A=C, B=C is true and therefore it is judged that a correct instruction is fetched and the branch prediction is successful. That is, when A not =C, even if B=C, it is checked that the branch prediction is a failure.

To solve the above problem of the first preferred embodiment, in the fourth preferred embodiment, a comparison between the tag (B) read from the instruction cache memory and the branch target address (C) obtained by the execution of the branch instruction is made to directly check if B=C. Thus, the tag check and the prediction hit checking are concurrently performed.

Figure 8:
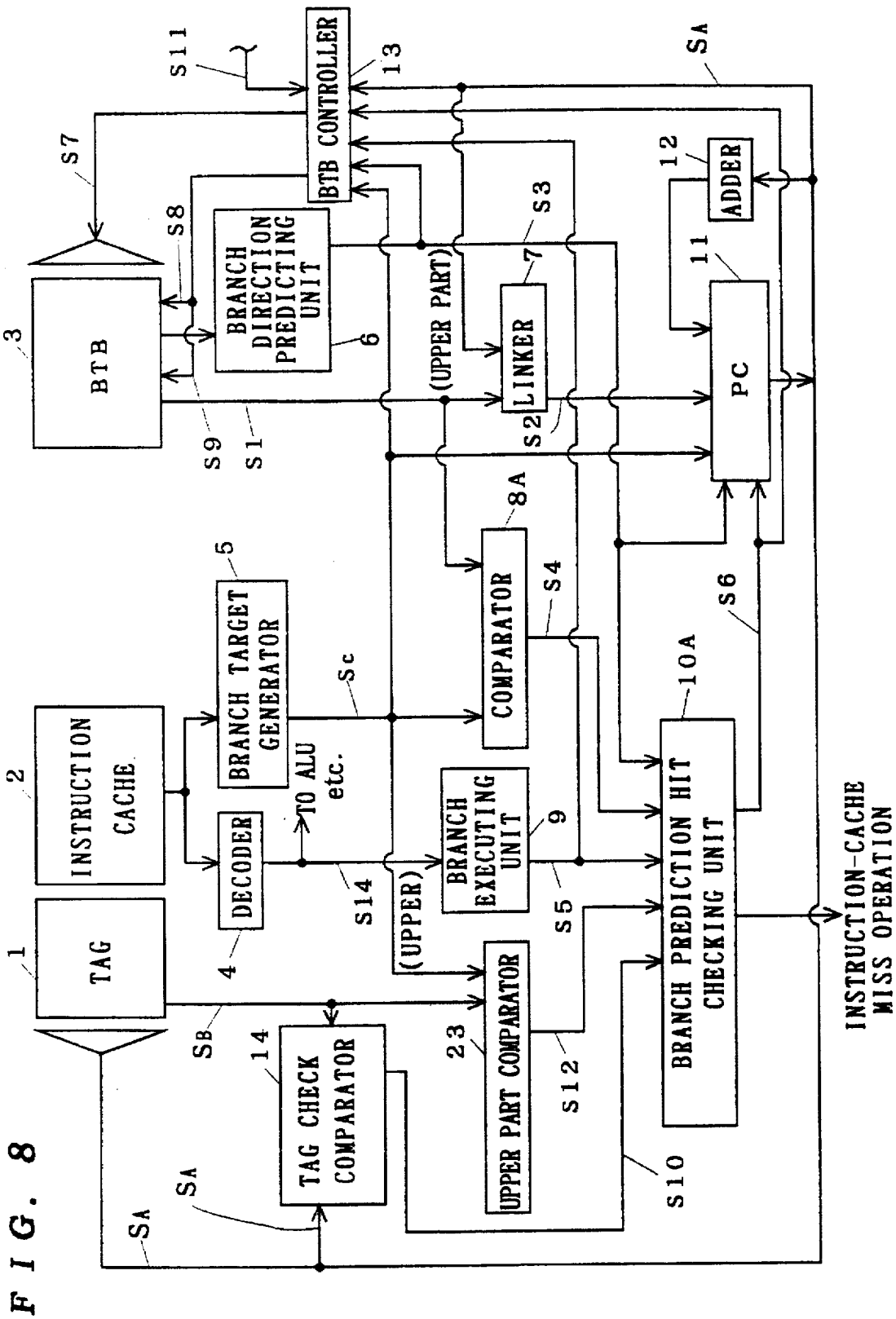
FIG. 8 is a block diagram showing a configuration of a branch prediction system in accordance with a fourth preferred embodiment of the present invention.
Figure 9:
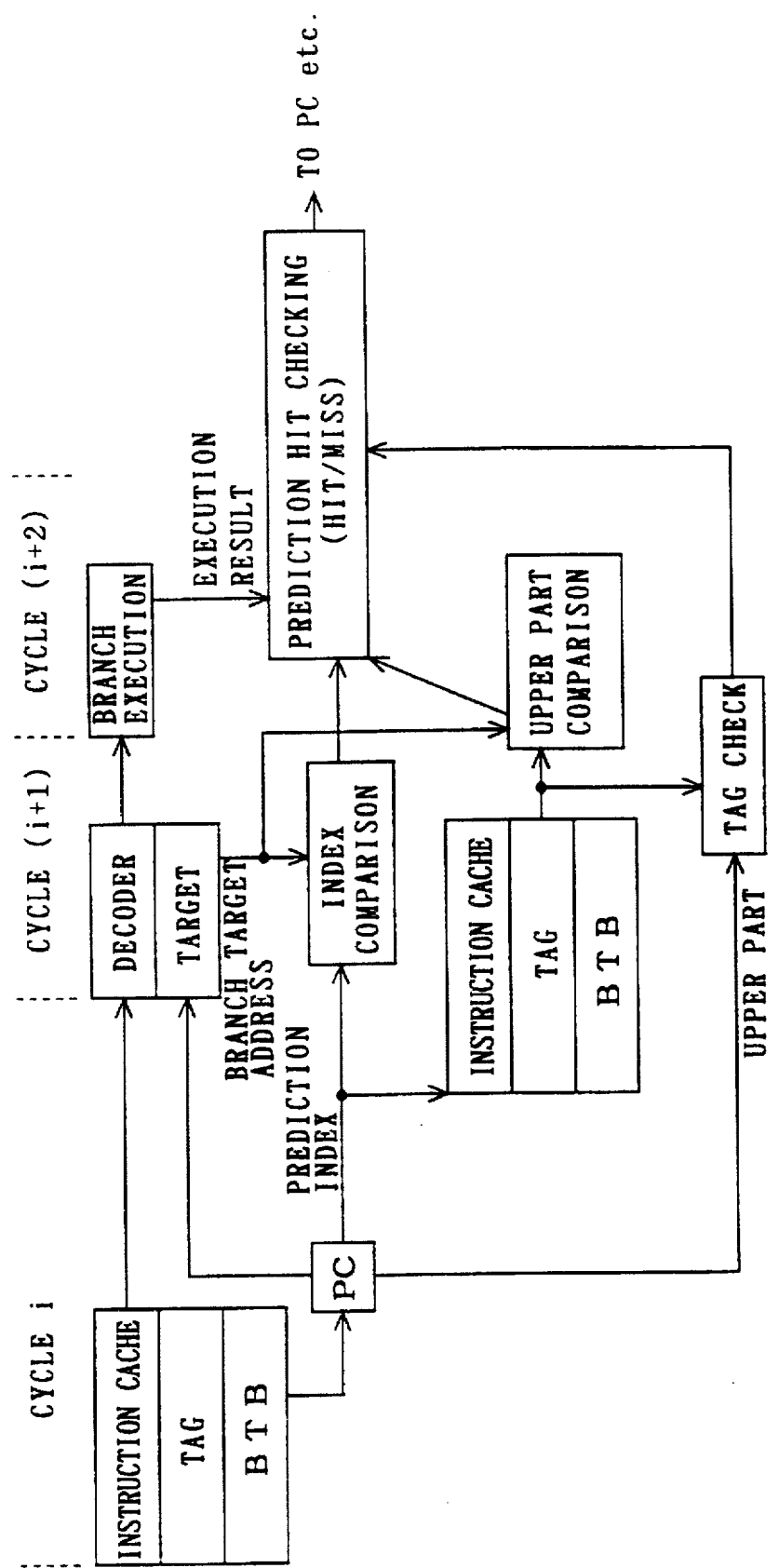
FIG. 9 is an illustration of a process flow of the fourth preferred embodiment of the present invention.

FIG. 8 is a block diagram showing a hardware configuration of the branch prediction system in accordance with the fourth preferred embodiment. A difference between the system of FIG. 8 and the system of the first preferred embodiment lies in that an upper part comparator 23 is additionally provided to compare the signal $S_B$ indicating the tag with the upper part of the signal $S_C$ indicating the branch target address, and a prediction index comparator 8A for comparing the indexes used for the access to the instruction cache memory is provided, instead of the comparator 8 of the first preferred embodiment shown in FIG. 3 which compares the predicted target address with the branch target address to check if they agree. The prediction index comparator 8A receives the signal S1 indicating the prediction index and the lower part of the branch target address signal $S_C$ outputted from the branch target generator 5. The branch-prediction hit checking unit 10A receives the signal S4 indicating the comparison result of agreement or disagreement outputted from the prediction index comparator 8A and the signal S12 indicating the comparison result of agreement or disagreement outputted from the upper part comparator 23 to check whether the prediction of the branch target address hits or misses. FIG. 9 shows a process flow and FIG. 10 shows a process rule of the above operation.

Thus, the fourth preferred embodiment ensures the prediction if the predicted target address and the branch target address have different upper parts, thereby improving the branch prediction hit rate.

<The Fifth Preferred Embodiment>

A characteristic feature of the fifth preferred embodiment lies in that the branch target address ($S_C$) and the PC output ($S_A$) can be selectively used as an address to be used for the tag check and the comparison of the upper parts. That makes it possible to concurrently perform the tag check for the instruction-cache miss operation and the prediction hit checking. Now, the point of the fifth preferred embodiment and the configuration thereof will be discussed below in detail.

In the fourth preferred embodiment, as shown in FIG. 8, when the prediction is "not-taken" and the branch is "Not-taken", or when an instruction is refetched, for judgment as to whether the instruction-cache miss operation should be performed, the tag check comparator (14) for comparing between the PC output ($S_A$) and tag ($S_B$) is needed.

To solve the above problem, in the fifth preferred embodiment, a selector selectively outputs the PC output ($S_A$) or the upper part of the branch target address ($S_C$) as an address to be used for the comparison between the index and the upper part, and the same comparator performs the branch prediction check and the judgment for the instruction-cache miss operation. That allows omission of the tag check comparator which is needed in the fourth preferred embodiment.

Figure 11:
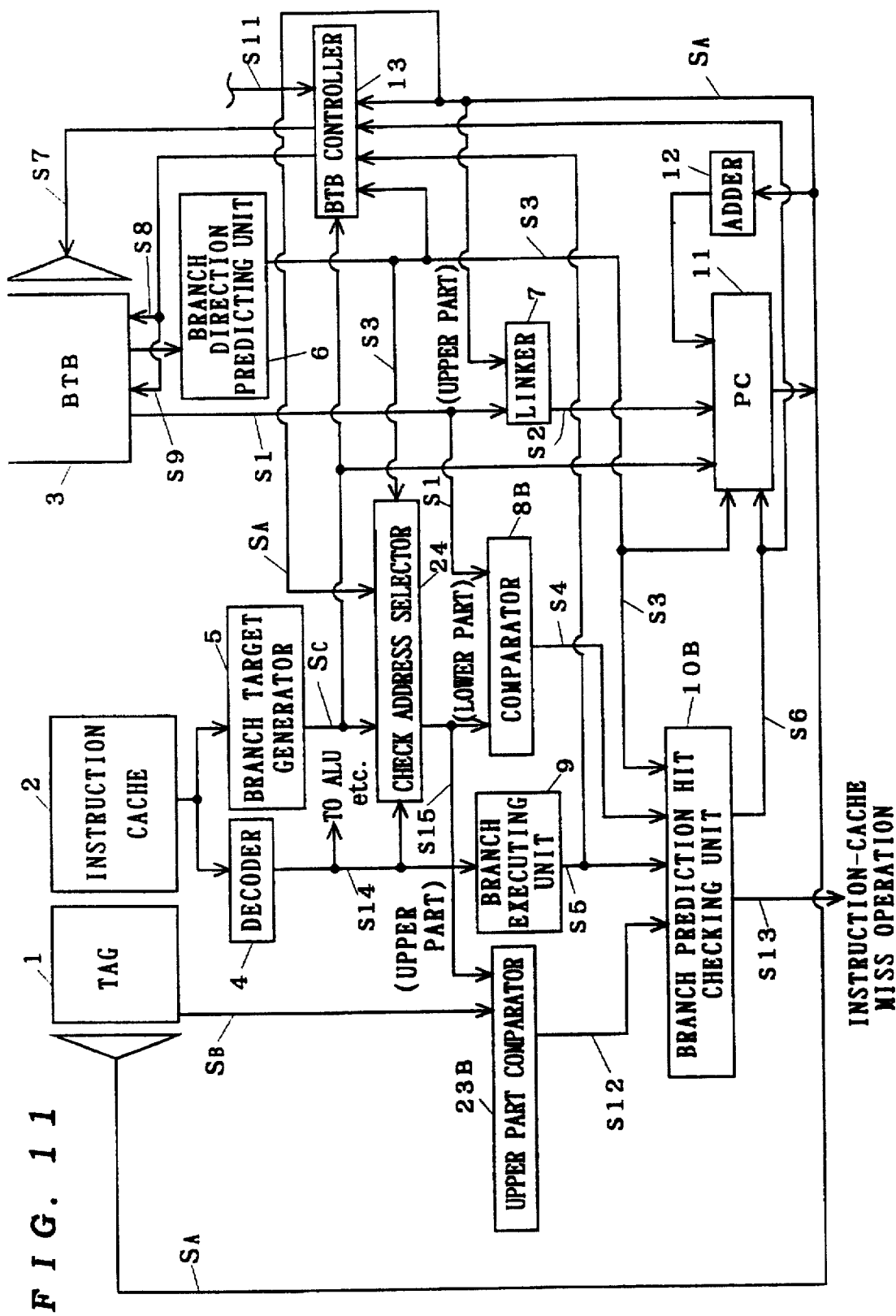
FIG. 11 is a block diagram showing a configuration of a branch prediction system in accordance with a fifth preferred embodiment of the present invention.
Figure 12:
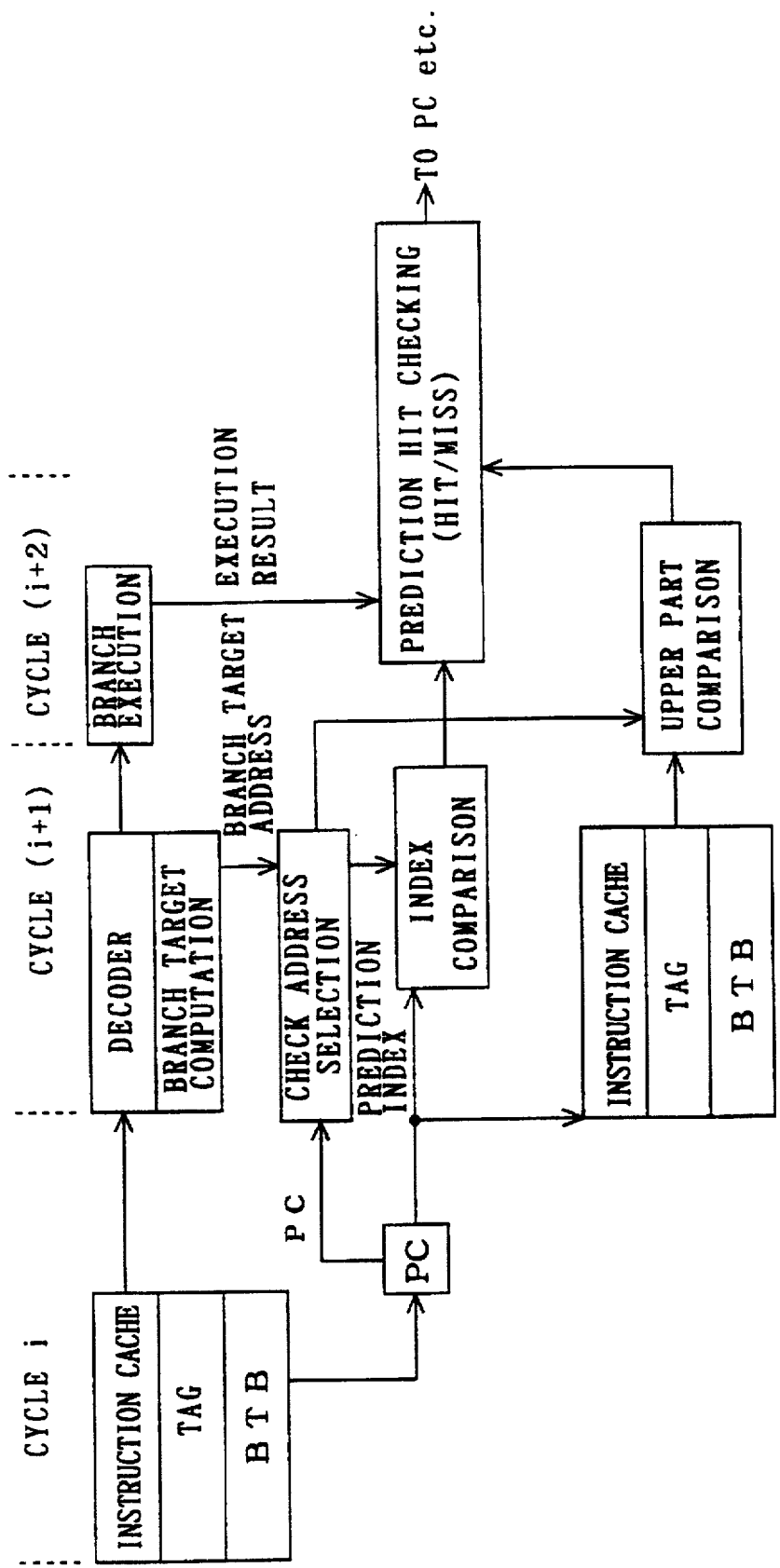
FIG. 12 is an illustration of a process flow of the fifth preferred embodiment of the present invention.

FIG. 11 is a block diagram showing a hard configuration of the fifth preferred embodiment. FIGS. 12 and 13 shows a process flow and a process rule of the fifth preferred embodiment, respectively. As shown in FIG. 11, a check address selector 24 is provided between the branch target generator 5 and a prediction index comparator 8B. The selector 24 receives the predicted direction signal S3 (indicating whether "taken" prediction or "not-taken" prediction) and the signal S14 indicating the decoded branch instruction and in response thereto, selectively outputs the upper part of the branch target address $S_C$ or that of the PC output signal $S_A$ as a signal S15. In FIG. 13, "PC" and "target" on the column of "Check Address" represent the upper part of the PC output and that of the branch target address ($S_C$), respectively.

Thus, the fifth preferred embodiment has an advantage of omitting the tag check comparator for the instruction-cache miss judgment.

<The Sixth Preferred Embodiment>

If the memory system of a processor supports a virtual memory, the program counter PC stores a virtual address. In the virtual memory system, either a physical tag or a virtual tag is stored in the instruction cache memory.

If the virtual tag is stored, for the instruction-cache miss judgment, a comparison between the tag read from the instruction cache memory and the PC output (virtual address) is made. If the physical tag is stored, the upper part of the PC output (called "virtual page number") needs to be translated into a physical page number for the tag check since the tag read from the instruction cache memory has a physical page number. For this translation, a translation lookaside buffer (hereinafter referred to as "TLB"), which is a buffer for address translation, is generally used. Specifically, when an access to the TLB is made using a virtual page number, a corresponding physical page number can be read therefrom. With the TLB, an address translation from the virtual address of the PC output into the physical address is achieved.

Figure 14:
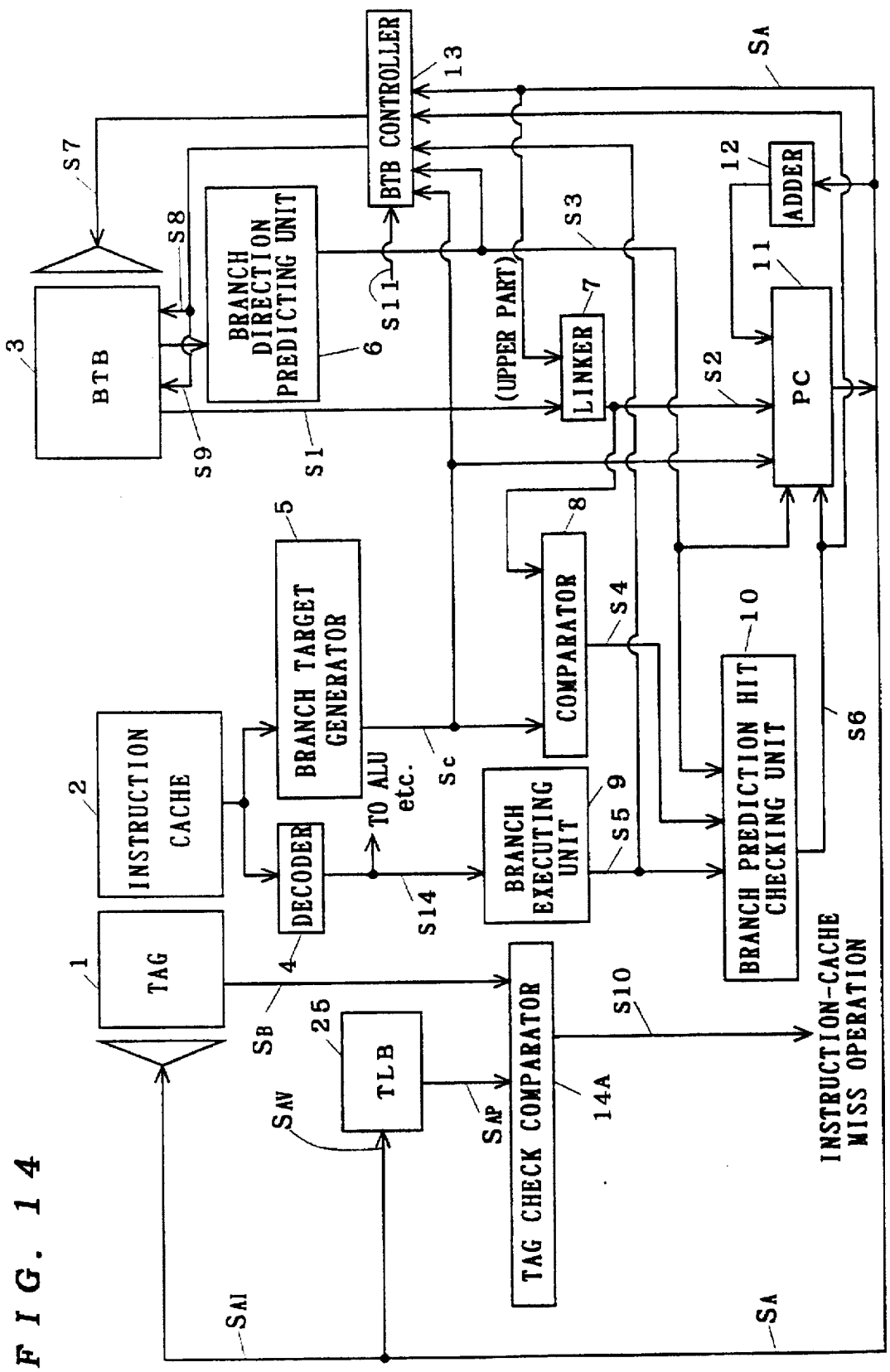
FIG. 14 is a block diagram showing a configuration of a branch prediction system on which a sixth preferred embodiment of the present invention is based.
Figure 15:
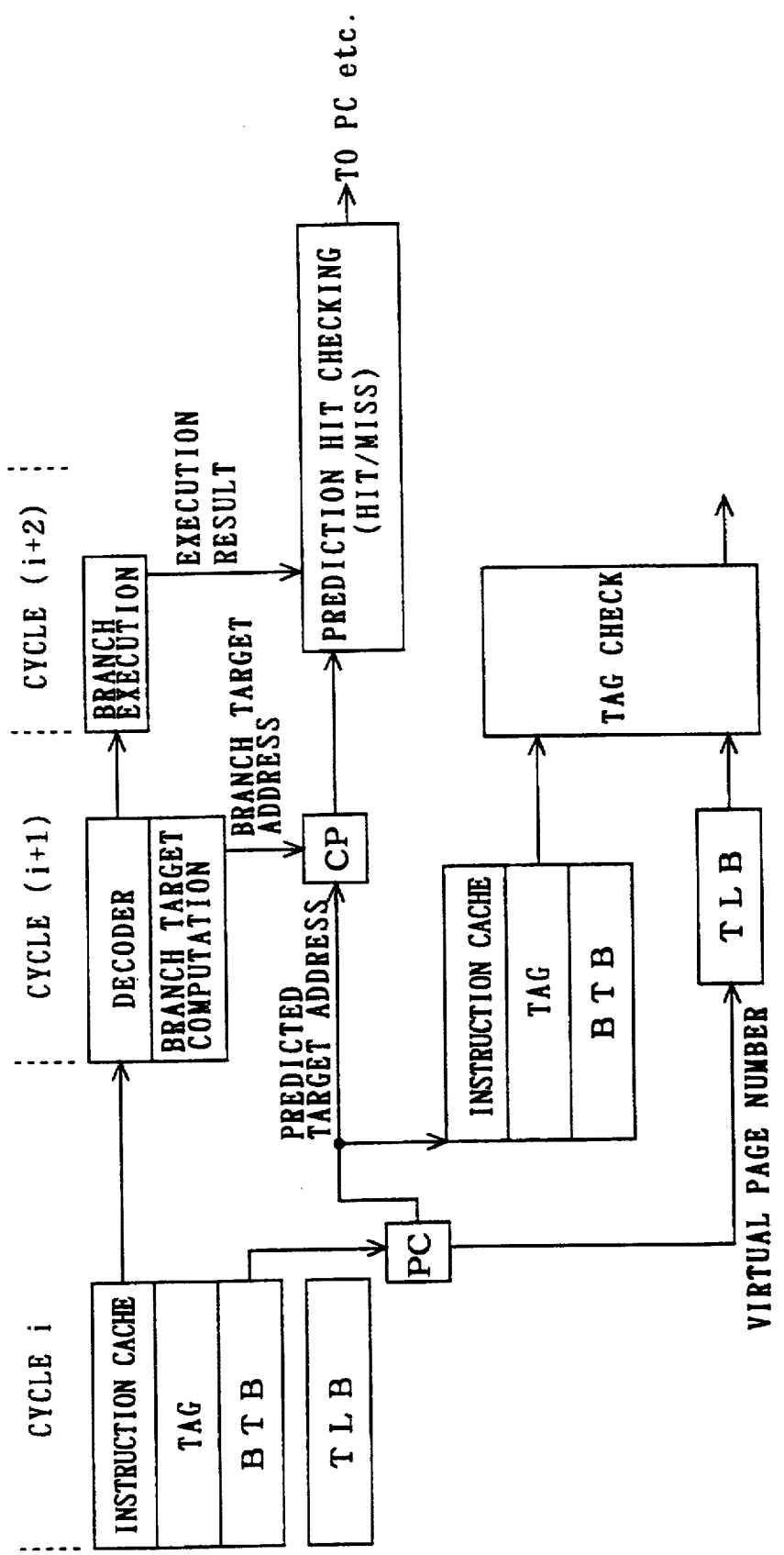
FIG. 15 is an illustration of a process flow in the branch prediction system of FIG. 14.

FIG. 14 shows a configuration of the system of the first preferred embodiment where a TLB is used when the system is a virtual memory system, and FIG. 15 shows a process flow of an operation in this system. The only difference in the operation procedure from the first preferred embodiment lies in that a translation (from a signal $S_{AV}$ of virtual page number to a signal $S_{AP}$ of physical page number) is additionally performed with a TLB 25 in the cycle (i+1).

Also in the system shown in FIG. 14 of a new configuration, the same problem as discussed in the fourth preferred embodiment arises. That is, when the branch instruction address and the branch target address have different upper parts, the checking always indicates a misprediction even if a correct instruction may be fetched.

To solve the above problem, in the sixth preferred embodiment, in the checking of the branch prediction, a comparison between the tag ($S_{BP}$: physical tag) read from the instruction cache memory and the physical page number read from the TLB using the branch target address (virtual address) obtained by the execution of the branch instruction is made to check if they agree. From the comparison result, the tag check and the check as to whether the branch prediction is correct or not are concurrently achieved.

Figure 16:
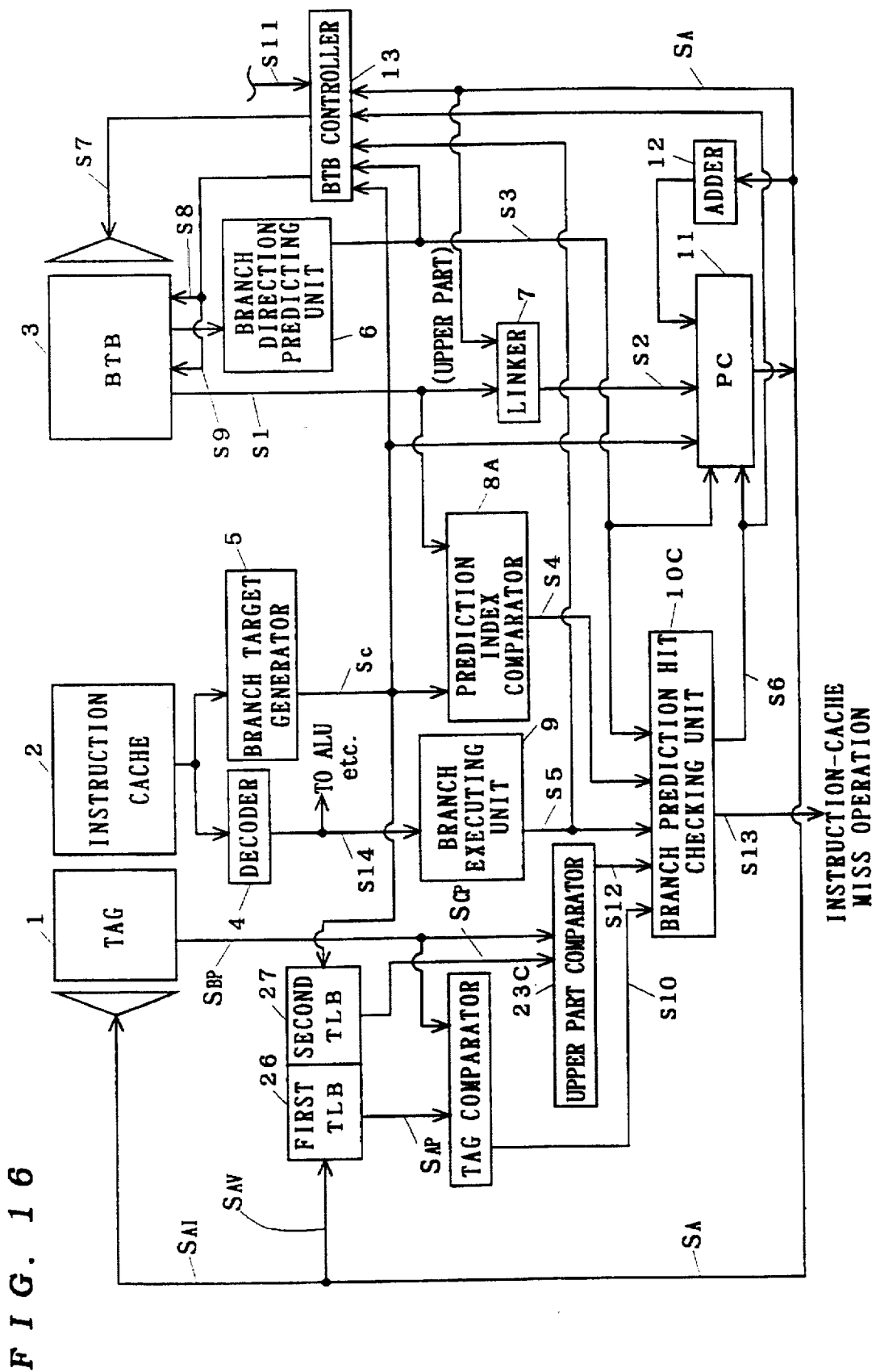
FIG. 16 is a block diagram showing a configuration of a branch prediction system in accordance with the sixth preferred embodiment of the present invention.

FIG. 16 shows a hardware configuration of the sixth preferred embodiment. Specifically, providing a TLB consisting of a first TLB 26 and a second TLB 27 increases the number of ports for the TLB, and allows the data access using the branch target address ($S_C$) to be performed concurrently with the data access using the PC output ($S_{AV}$). An upper part comparator 23C is further provided to compare a signal ($S_{CP}$) indicating a physical page number read from the second TLB 27 with the signal $S_{BP}$ indicating the physical tag, checking if they agree. The prediction index comparator 8A, for checking if the predicted target address and the branch target address ($S_C$) are in agreement, performs a comparison between the prediction index signal S1 and the branch target address signal $S_C$, that is, a comparison of the indexes for the instruction cache memory.

Figure 17:
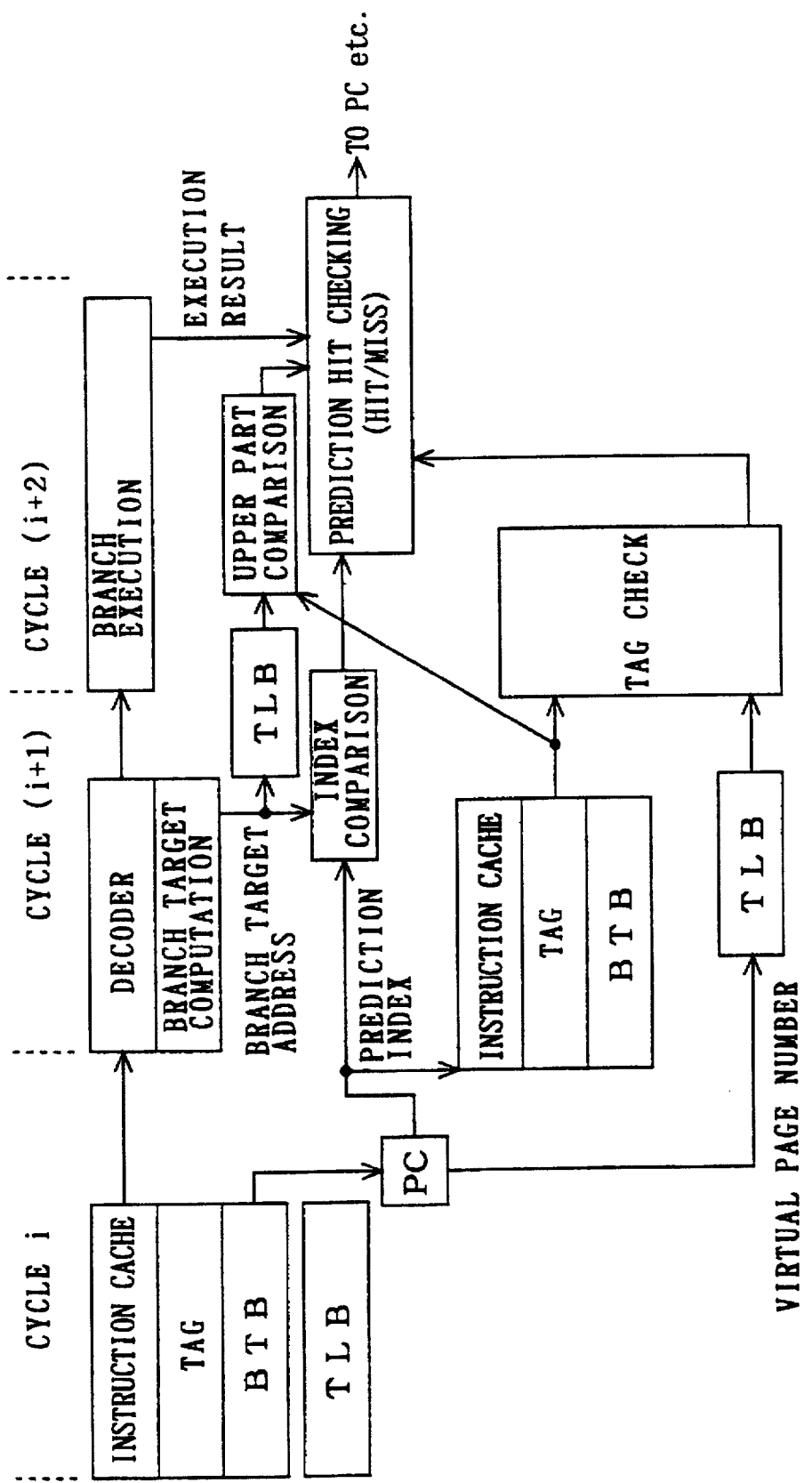
FIG. 17 is an illustration of a process flow of the sixth preferred embodiment of the present invention.

FIG. 17 shows an operation process. A process rule of this system is the same as shown in FIG. 10.

Thus, the sixth preferred embodiment ensures the branch prediction even if the predicted target address and the branch target address have different upper parts, and therefore advantageously improves the branch prediction hit rate.

<The Seventh Preferred Embodiment>

The sixth preferred embodiment needs two physical page numbers, i.e., the signal $S_{AP}$ of FIG. 16 read from the TLB using the PC output for the instruction-cache miss judgment and the signal $S_{CP}$ of FIG. 16 read therefrom using the branch target address for the branch prediction hit check, and needs correspondingly the TLB of two-port configuration. Further, two comparators for the tag check and the upper part comparison are correspondingly needed.

The seventh preferred embodiment allows a selective use of the branch target address and the PC output as the address to be used for the comparison between the index and the upper part, to reduce the input of the TLB to one, thereby ensuring the concurrent operation of the instruction-cache miss check and the branch prediction check. That will be specifically discussed below.

Figure 18:
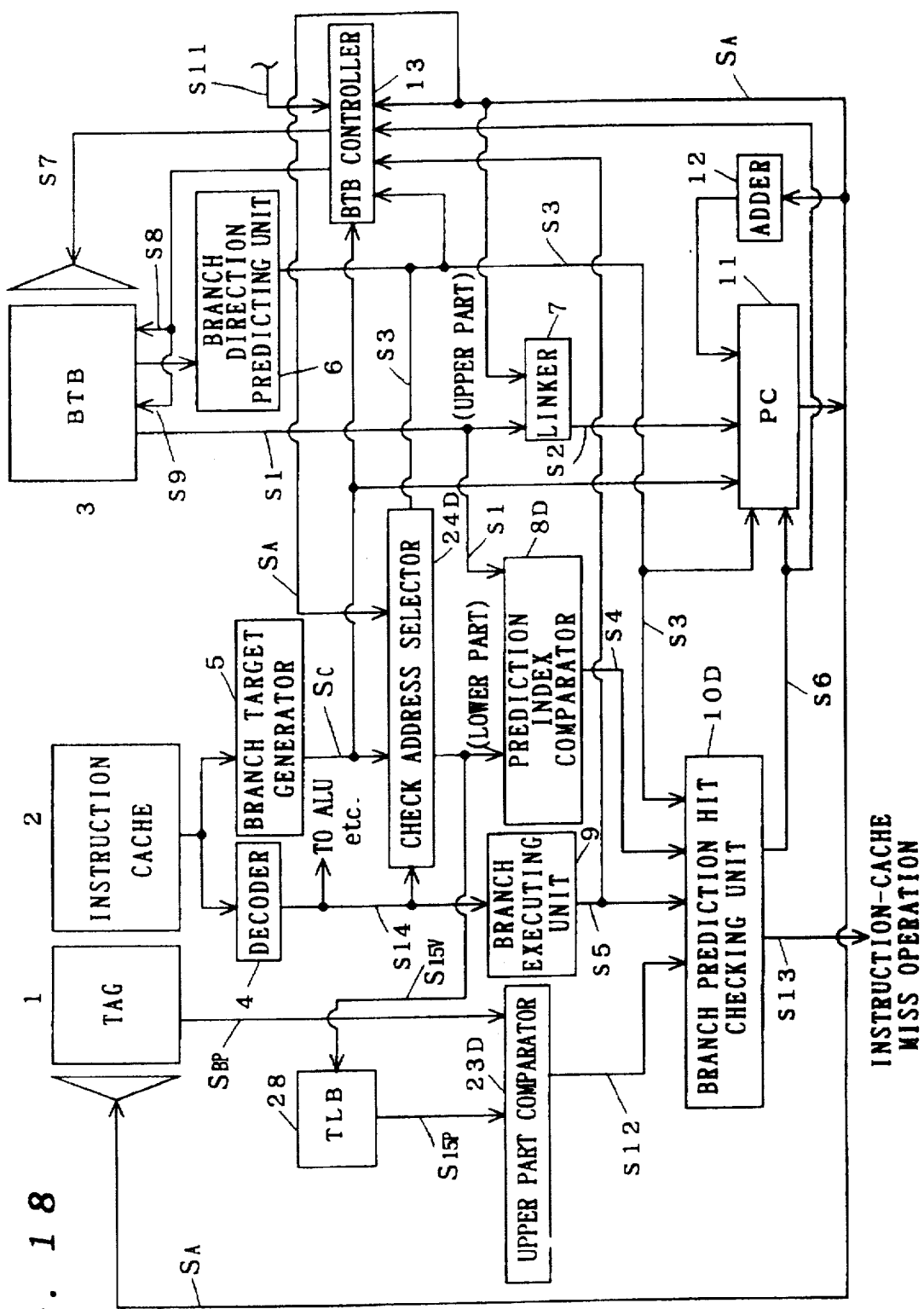
FIG. 18 is a block diagram showing a configuration of a branch prediction system in accordance with a seventh preferred embodiment of the present invention.

In this system, as shown in FIG. 18, a check address selector 24D provided between the branch target generator 5 and a prediction index comparator 8D selects either the Pc output ($S_A$) or the branch target address ($S_C$) as the address to be used for the comparison between the index and the upper part, to output the selected one as a signal $S15_V$ to a TLB 28. The upper part comparator 23D and a branch-prediction hit checking unit 10D can thereby perform the branch prediction check and the instruction-cache miss judgment, using the same address, i.e., the address indicated by a signal $S15_P$. Therefore, no need for the tag check comparator arises and the TLB of one-port configuration can be used.

Figure 19:
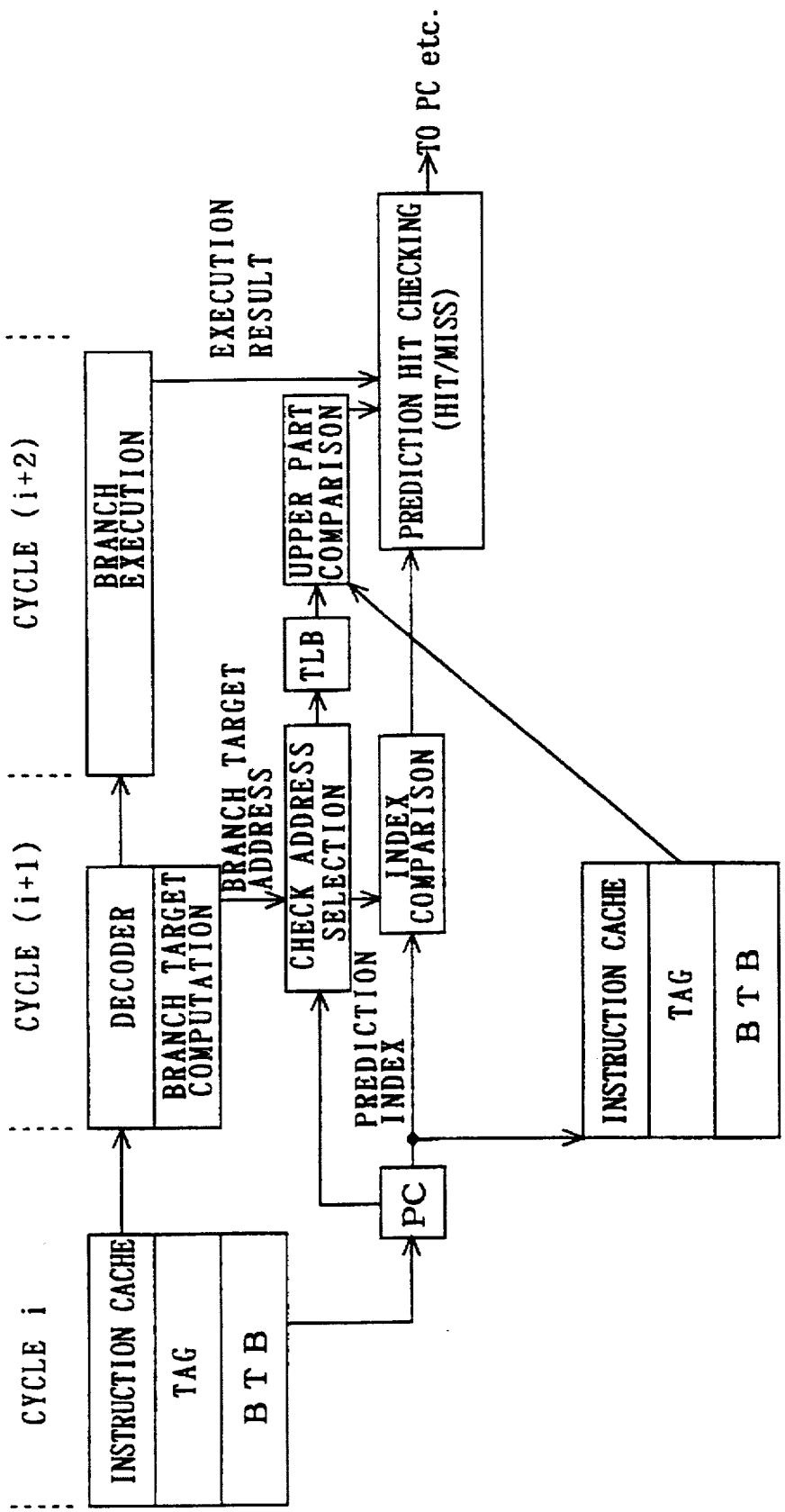
FIG. 19 is an illustration of a process flow of the seventh preferred embodiment of the present invention.

FIG. 19 shows a process flow in this system. A process rule of this system is the same as shown in FIG. 13.

Thus, the seventh preferred embodiment has an advantage of omitting the tag check comparator for the instruction-cache miss judgment and of reducing the reading port for the TLB to one.

<The Eighth Preferred Embodiment>

Figure 20:
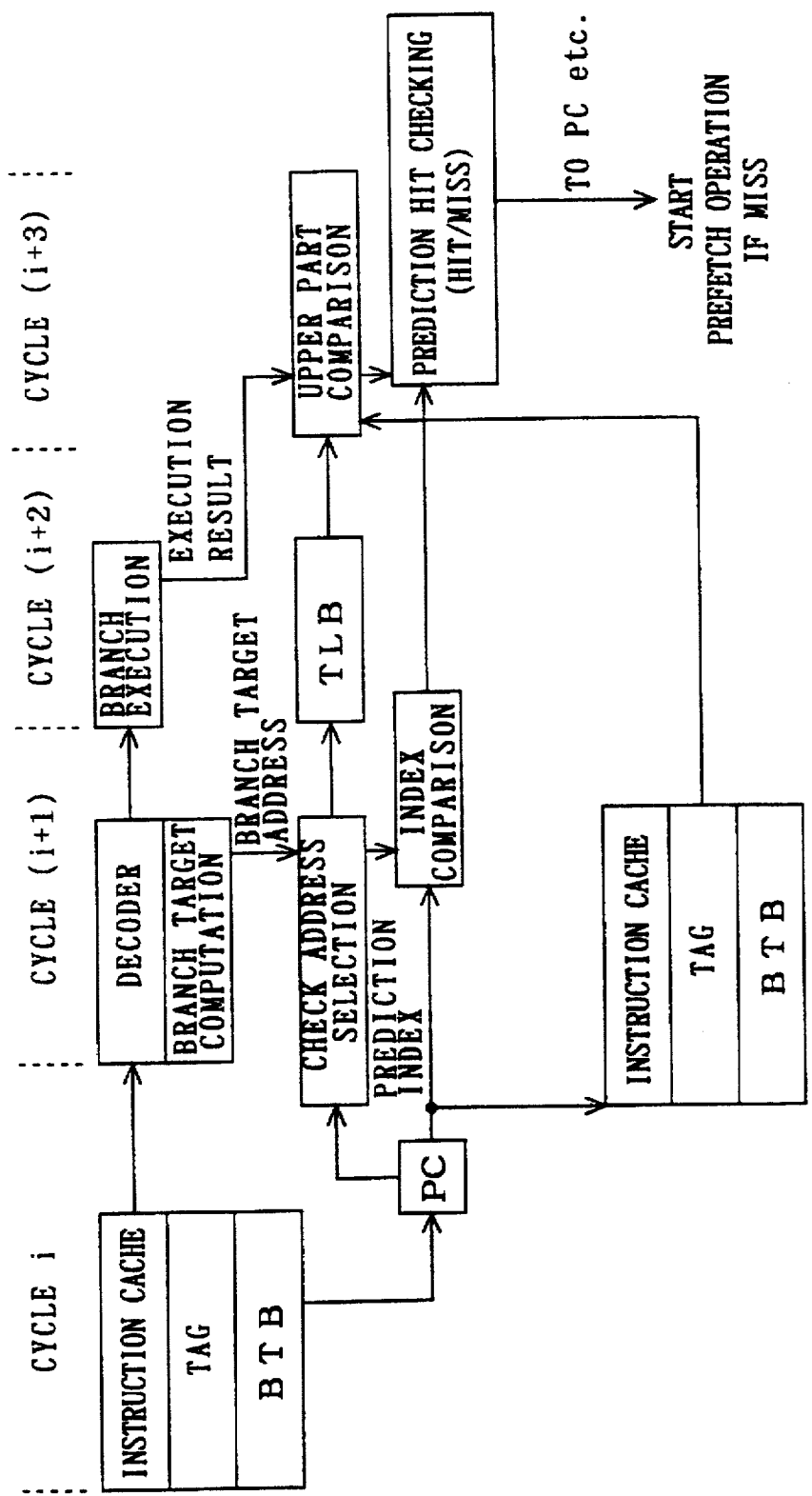
FIG. 20 is an illustration to point out a problem of the seventh preferred embodiment of the present invention.

Since the seventh preferred embodiment has a configuration requiring time for generation of the branch target address and access to the TLB, as shown in FIG. 20, when the branch prediction misses, even if the misprediction is revealed in the cycle (i+2), for example, in a case of a miss execution of the "Taken" branch due to the "not-taken" prediction or an execution of the "Not-taken" branch due to the "taken" prediction, the hit check made in the cycle (i+3) is waited, to disadvantageously cause three-cycle idleness in a pipelined operation.

To solve the above problem, the eighth preferred embodiment starts a refetch operation at the point in time when the misprediction is revealed by disagreement of the branch directions or disagreement of the prediction indexes.

Figure 21:
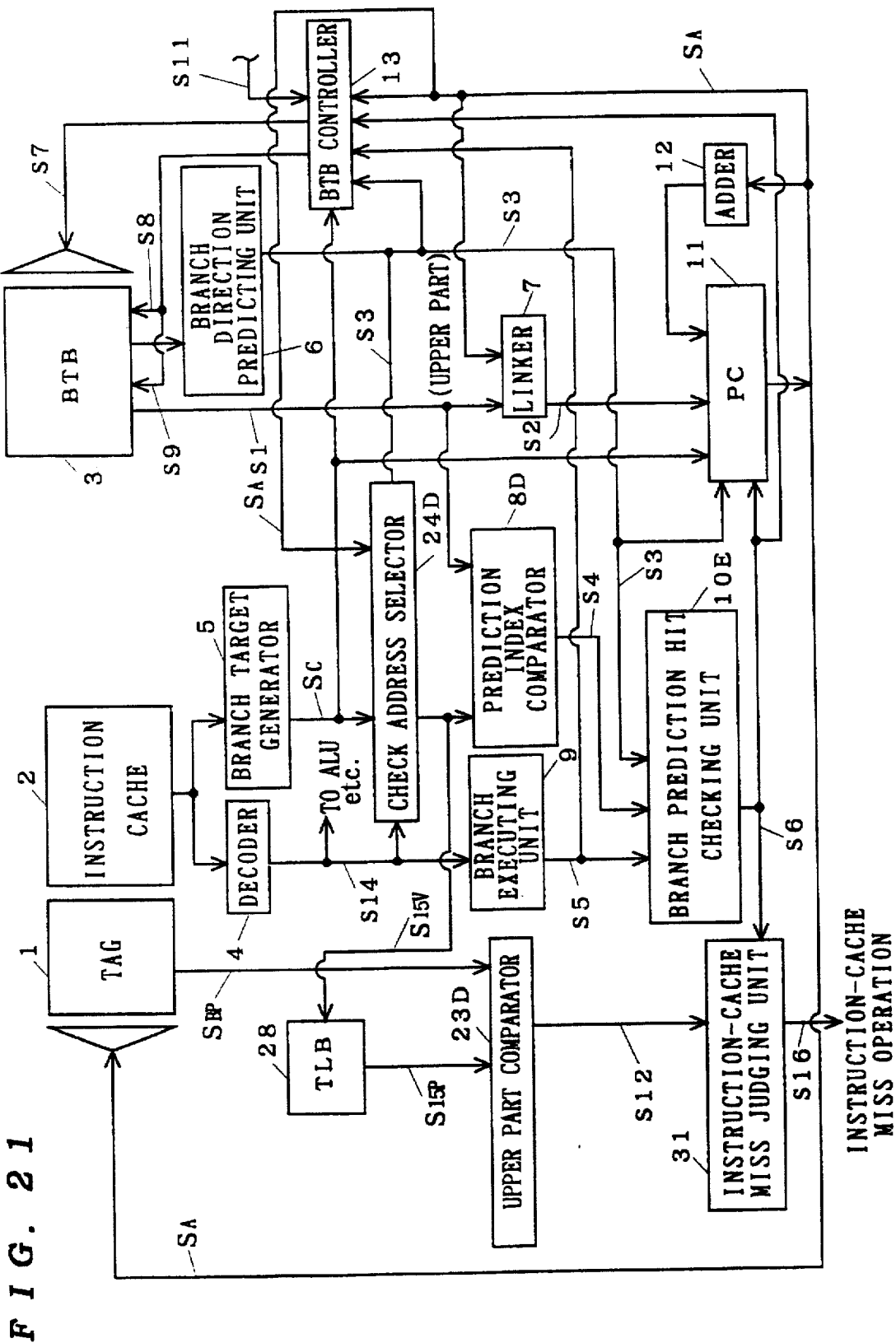
FIG. 21 is a block diagram showing a configuration of a branch prediction system in accordance with an eighth preferred embodiment of the present invention.

For the above solution, the eighth preferred embodiment has a configuration, where a branch-prediction hit checking unit 10E and an instruction-cache miss judging unit 31 are separately provided, as shown in FIG. 21. The branch-prediction hit checking unit 10E receives the predicted direction signal S3 and the execution result signal S5 with regard to the branch direction and further receives the signal S4 giving the comparison result with regard to the prediction index. When the branch-prediction hit checking unit 10E detects a misprediction by disagreement of the branch directions or disagreement of the prediction indexes, the refetch operation starts without waiting the result of the tag check. On the other hand, when no misprediction is detected, the instruction-cache miss judging unit 31, in the subsequent stage, makes the instruction-cache miss judgment by the result (S12) of the tag check. The instruction-cache miss judging unit 31 includes an AND gate, for example.

Figure 22:
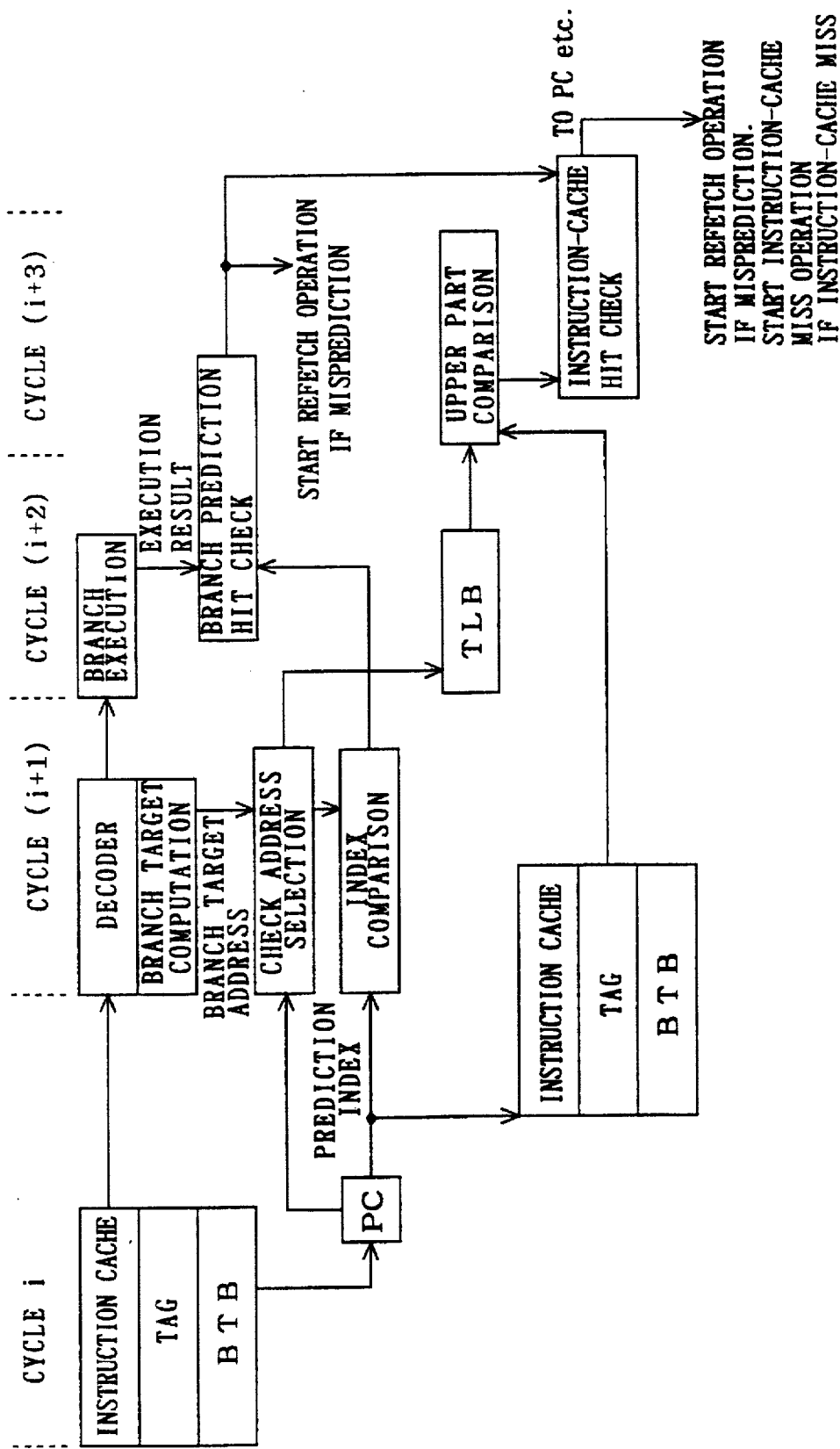
FIG. 22 is an illustration of a process flow of the eighth preferred embodiment of the present invention.

FIGS. 22 and 23 show a process flow and a process rule of that operation, respectively.

Thus, the eighth preferred embodiment has an advantage of decreasing a penalty cycle in a case of the misprediction judged by disagreement of the branch directions or disagreement of the prediction indexes.

<The Ninth Preferred Embodiment>

Figure 24:
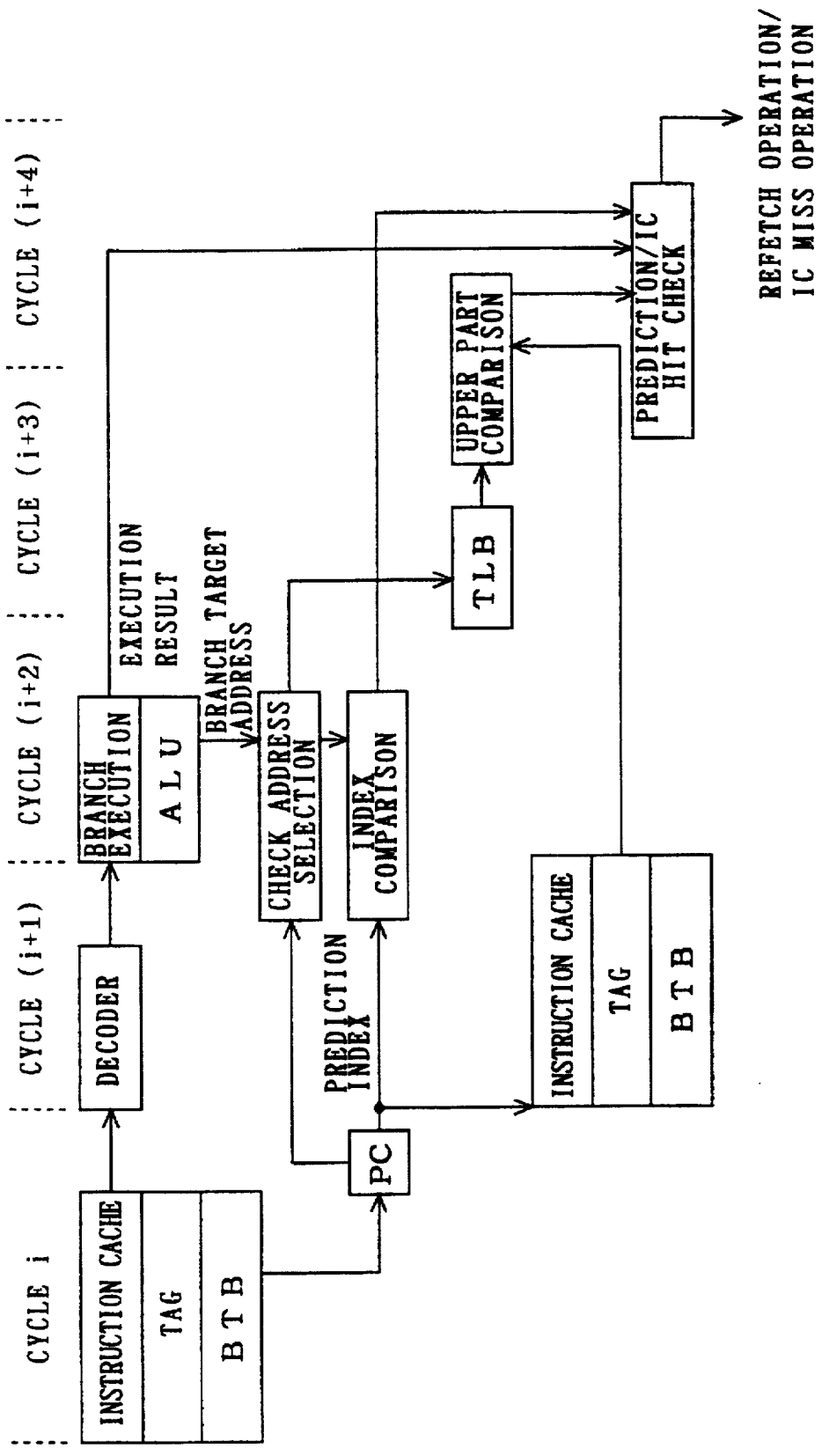
FIG. 24 is an illustration to point out a problem of the eighth preferred embodiment of the present invention.

In generation of the branch target address using ALU (Arithmetic Logic Unit) of an EXC (execution) stage, as shown in FIG. 24, the sixth and seventh preferred embodiments have a problem that a delay of the access to the TLB causes four-cycle penalty in the case of misprediction.

To solve the above problem, in the ninth preferred embodiment, the TLB is directly searched using the tag (physical tag) read from the instruction cache memory to read a virtual page number at the entry of the same physical page number. Then, a comparison between a signal indicating the virtual page number and a signal indicating an upper part of the branch target address obtained by the execution of the branch instruction is made to check if they agree, and the branch hit check is made by the comparison result. A configuration of the ninth preferred embodiment will be discussed below in detail.

In the prior-art, the access to the TLB is made using an address signal as virtual page number to read therefrom an address signal as physical page number. The tag check comparator compares the address as physical page number with the physical tag, to make the instruction-cache miss judgment.

In a system constitution as shown in FIG. 24, a timing for reading a physical tag is one cycle ahead of generation of a signal as virtual page number (the upper part of the branch target address) to be used for the access to the TLB by the check address selector. Utilizing that, in the ninth preferred embodiment, a direct access to the TLB is made using the physical tag signal ($S_{BP}$) which is read earlier, to read a signal ($S_{BV}$) of virtual page number from the TLB. Comparing the signal of virtual page number for the instruction read from the TLB with the signal of virtual page number obtained by the execution of the branch instruction, if they agree, it can be judged that a correct instruction to be executed is fetched, because of a one-to-one correspondence between the virtual page number and the physical page number in the TLB.

In this system, the TLB performs a translation from the signal of physical page number to the signal of virtual page number, which is an inverse of the translation made by the prior-art TLB, from the signal of virtual page number to the signal of physical page number.

Figure 25:
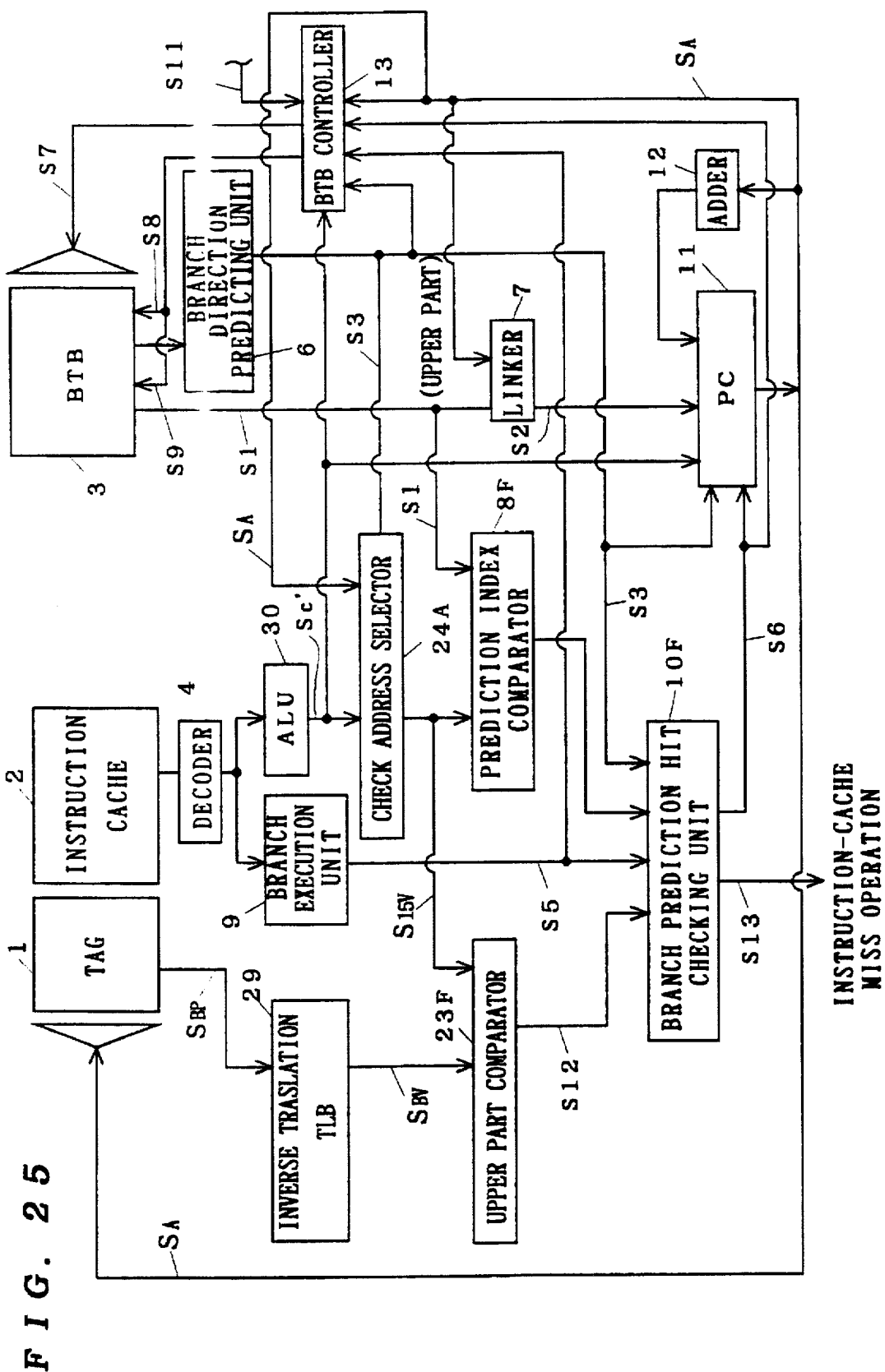
FIG. 25 is a block diagram showing a configuration of a branch prediction system in accordance with a ninth preferred embodiment of the present invention.
Figure 26:
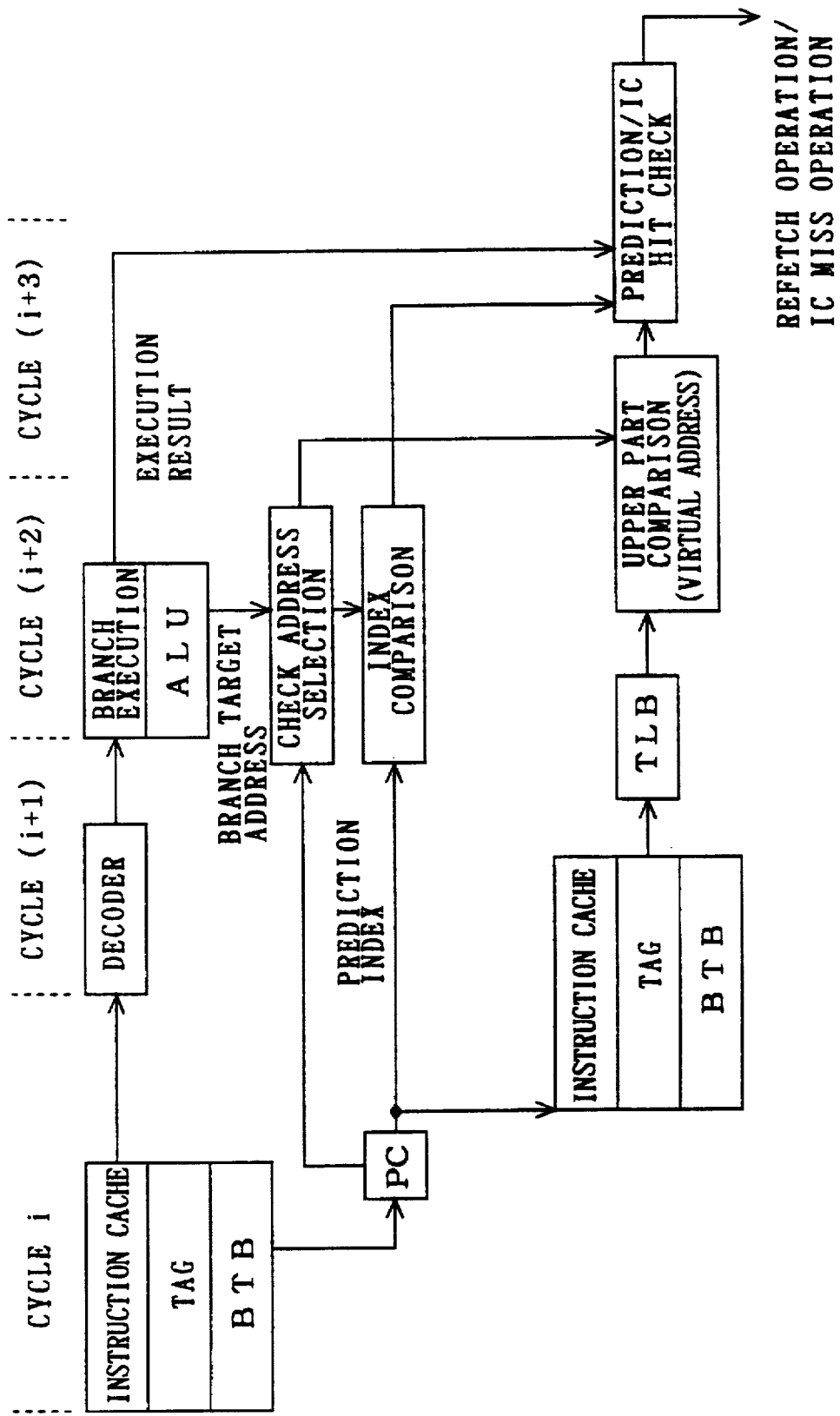
FIG. 26 is an illustration of a process flow of the ninth preferred embodiment of the present invention.

FIG. 25 shows a hardware configuration of this system using a TLB for inverse translation (address inverse-translation buffer) 29, and FIG. 26 shows a process flow thereof. An process rule of this system is the same as shown in FIG. 13.

Thus, the ninth preferred embodiment has an advantage of reducing the penalty of the instruction-cache miss by one cycle.

While the invention has been shown and described in detail, the foregoing description is in all aspects illustrative and not restrictive. It is therefore understood that numerous modifications and variations can be devised without departing from the scope of the invention.

I claim:

1. A branch predication system which performs a branch prediction when a branch instruction is fetched in a device executing instructions in a pipelined processing flow, the system comprising:

an instruction cache memory for storing said instructions;

a branch target buffer for storing a signal indicating a lower part of a branch target address obtained in advance by execution of said branch instruction as a prediction index signal;

branch instruction address generating means for generating and outputting a signal indicating a branch instruction address of said branch instruction actually fetched;

linking means for linking said prediction index signal fetched from said branch target buffer with an upper part of said branch instruction address indicated by an output signal of said branch instruction address generating means to generate and output a signal indicating a predicted target address;

branch target generating means for generating and outputting a signal indicating said branch target address obtained by actually executing said branch instruction;

comparing means for comparing a first output signal of said branch target generating means with a second output signal of said linking means to output a signal indicating whether or not the first and second output signals agree; and branch target buffer controlling means for comparing an upper part of said branch target address indicated by said output signal of said branch target generating means with said upper part of said branch instruction address indicated by said output signal of said branch instruction address generating means and for storing a lower part of said branch target address into said branch target buffer only when said upper part of said branch target address and said upper part of said branch instruction address agree.

2. The branch prediction system of claim 1, wherein said branch target buffer stores a signal indicating a history information obtained in advance by execution of said branch instruction, said branch prediction system further comprising:

branch executing means for generating and outputting a signal indicating a branch direction obtained by actual execution of said branch instruction;

branch direction predicting means for generating and outputting a signal indicating a predicted branch direction in accordance with said signal indicating said history information fetched from said branch target buffer;

prediction hit checking means for performing a comparison between a third output signal of said branch executing means and a fourth output signal of said branch direction predicting means to check if the third and fourth output signals agree and for checking whether said branch prediction hits or misses by a result of said comparison and a result indicated by an output signal of said comparing means to generate and output a signal indicating a prediction high checking result; and instruction-cache miss judging means for generating and outputting a signal giving a command to start an instruction-cache miss operation only when an output signal of said prediction hit checking means indicates said branch prediction hits.

3. A branch prediction system which performs a branch prediction when a branch instruction is fetched in a device executing instructions in a pipelined processing flow, the system comprising:

an instruction cache memory for storing said instructions;

a branch target buffer for storing a signal indicating a lower part of a branch target address obtained in advance by execution of said branch instruction as a prediction index signal and for storing a signal indicating a history information obtained in advance by execution of said branch instruction;

branch instruction address generating means for generating and outputting a signal indicating a branch instruction address of said branch instruction actually fetched;

linking means for linking said prediction index signal fetched from said branch target buffer with an upper part of said branch instruction address indicated by an output signal of said branch instruction address generating means to generate and output a signal indicating a predicted target address;

branch target generating means for generating and outputting a signal indicating said branch target address obtained by actually executing said branch instruction;

comparing means for comparing a first output signal of said branch target generating means with a second output signal of said linking means to output a signal indicating whether or not the first and second output signals agree;

branch executing means for generating and outputting a signal indicating a branch direction obtained by actual execution of said branch instruction;

branch direction predicting means for generating and outputting a signal indicating a predicted branch direction in accordance with said signal indicating said history information fetched from said branch target buffer;

prediction hit checking means for performing a comparison between an output signal of said branch executing means and an output signal of said branch direction predicting means to check if they agree and for checking whether said branch prediction hits or misses by a result of said comparison and a result indicated by an output signal of said comparing means to generate and output a signal indicating a prediction hit check result; and instruction cache miss judging means which does not start instruction-cache miss judgment of said instruction-cache memory until an output signal of said prediction hit checking means indicates that said branch prediction hits, executes said instruction-cache miss judgement only when the branch prediction hits, and gives a command to start an instruction-cache miss operation when miss hit of said instruction-cache is detected, said instruction-cache miss judgement being a comparison between a tag signal stored in said instruction-cache memory and a portion corresponding to said branch instruction address, said instruction-cache miss operation being an operation to read out a required instruction from another storing device being at a level one stage lower than said instruction-cache memory when said tag signal stored in said instruction-cache memory and said portion corresponding to said branch instruction address do not agree.

4. A branch prediction system which performs a branch prediction when a branch instruction is fetched in a device executing instructions in a pipelined processing flow, the system comprising:

an instruction cache memory for storing said instructions;

a branch target buffer for storing a signal indicating a lower part of a branch target address obtained in advance by execution of said branch instruction as a prediction index signal;

branch instruction address generating means for generating and outputting a signal indicating a branch instruction address of said branch instruction actually fetched;

linking means for linking said prediction index signal fetched from said branch target buffer with an upper part of said branch instruction address indicated by an output signal of said branch instruction address generating means to generate and output a signal indicating a predicted target address;

branch target generating means for generating and outputting a signal indicating said branch target address obtained by actual execution of said branch instruction;

prediction index comparing means for comparing said lower part of said branch target address indicated by an output signal of said branch target generating means with said prediction index signal fetched from said branch target buffer to output a signal indicating whether or not said lower part of said branch target address and said prediction index signal agree;

upper part comparing means for comparing a signal indicating a tag fetched from said instruction cache memory in response to said output signal of said branch instruction address generating means with an upper part of said branch target address indicated by said output signal of said branch target generating means to output a signal indicating whether or not said signal indicating the tag fetched and said upper part of said branch target address agree; and branch prediction hit checking means for checking whether said predicted target address hits or misses based on an output signal of said prediction index comparing means and an output signal of said upper part comparing means.

5. The branch prediction system of claim 4, further comprising:

check address selecting means having inputs connected to said branch target generating means and said branch instruction address generating means respectively and outputs connected to said prediction index comparing means and said upper part comparing means respectively, for selectively outputting said output signal of said branch instruction address generating means or said output signal of said branch target generating means, said check address selecting means, in a case of selecting said output signal of said branch instruction address generating means, outputting the same only to said upper part comparing means.

6. The branch prediction system of claim 5, wherein said instruction cache memory stores a signal indicating a physical tag, and a buffer for address translation is provided between one of said outputs of said check address selecting means and an input of said upper part comparing means, for performing a translation from an output signal of said check address selecting means to a signal of a physical page number.

7. The branch prediction system of claim 5, wherein said instruction cache memory stores a signal indicating a physical tag, and a buffer for inverse translation is provided between an output of said instruction cache memory and an input of said upper part comparing means, for performing an inverse translation from said signal indicating said physical tag to a signal of a virtual page number.

8. The branch prediction system of claim 4, wherein said instruction cache memory stores a signal indicating a physical tag, and said system further comprising a buffer for address translation coupled between an output of said branch target generating means and an input of said upper part comparing means, for performing a translation from said output signal of said branch target generating means to a signal of a physical page number.

9. A branch prediction system which performs a branch prediction when a branch instruction is fetched in a device executing instructions in a pipelined processing flow, the system comprising:

an instruction cache memory for storing said instructions;

a branch target buffer for storing a signal indicating a lower part of a branch target address obtained in advance by execution of said branch instruction as a prediction index signal;

branch instruction address generating means for generating and outputting a signal indicating a branch instruction address of said branch instruction actually fetched;

linking means for linking said prediction index signal fetched from said branch target buffer with an upper part of said branch instruction address indicated by an output signal of said branch instruction address generating means to generate and output a signal indicating a predicted target address;

branch target generating means for generating and outputting a signal indicating said branch target address obtained by actual execution of said branch instruction;

prediction index comparing means for comparing whether or not said lower part of said branch target address indicated by an output signal of said branch target generating means and said prediction index signal fetched from said branch target buffer agree; and upper part comparing means for comparing whether or not a signal indicating a tag fetched from said instruction cache memory in response to said output signal of said branch instruction address generating means and an upper part of said branch target address indicated by said output signal of said branch target generating means agree; and check address selecting means having inputs connected to said branch target generating means and said branch instruction address generating means respectively and outputs connected to said prediction index comparing means and said upper part comparing means respectively, for selectively outputting said output signal of said branch instruction address generating means or said output signal of said branch target generating means, said check address selecting means, in a case of selecting said output signal of said branch instruction address generating means, outputting said output signal of said branch instruction address generating means only to said upper part comparing means, wherein said instruction cache memory stores a signal indicating a physical tag, and a buffer for address translation coupled between one of said outputs of said check address selecting means and an input of said upper part comparing means, for performing a translation from an output signal of said check address selecting means to a signal of a physical page number, branch executing means for generating and outputting a signal indicating a branch direction obtained by actual execution of said branch instruction;

branch direction predicting means for generating and outputting a signal indicating a predicted branch direction in accordance with said signal indicating said history information fetched from said branch target buffer;

prediction hit checking means for comparing if an output signal of said branch executing means and an output signal of said branch direction predicting means agree and for checking whether said branch prediction hits or misses in accordance with a result of said comparing and a result indicated by an output signal of said prediction index comparing means to generate and output a signal indicating a prediction hit checking result; and instruction-cache miss judging means connected to an output of said upper part comparing means and an output of said prediction hit checking means, for generating and outputting a signal giving a command to start an instruction-cache miss operation only when an output signal of said prediction hit checking means indicates that said branch prediction hits, wherein said prediction hit checking means comprises a means for giving a command to start a refetch operation by outputting said signal indicating said prediction hit checking result at a point in time when it is checked that said branch prediction misses.

* * * * *